United States Patent
Nagata et al.

(10) Patent No.: US 6,567,349 B2
(45) Date of Patent: May 20, 2003

(54) RECORDING MEDIUM, EDITING METHOD AND EDITING APPARATUS

(75) Inventors: Osamu Nagata, Tokyo (JP); Yuji Arataki, Tokyo (JP); Hirokazu Imazeki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/225,017

(22) Filed: Aug. 21, 2002

(65) Prior Publication Data

US 2002/0196713 A1 Dec. 26, 2002

Related U.S. Application Data

(62) Division of application No. 09/901,277, filed on Jul. 9, 2001.

(30) Foreign Application Priority Data

Sep. 4, 2000 (JP) .......................................... 2000-267809
Jun. 22, 2001 (JP) .......................................... 2001-190282

(51) Int. Cl.$^7$ .................. G11B 27/02; G11B 20/10; G11B 27/034; G11B 27/028; G06F 7/22
(52) U.S. Cl. .................. 369/30.07; 345/721; 386/126; 386/54; 707/1; 84/602; 711/111; 369/83
(58) Field of Search .................. 369/30.07, 83; 711/111; 345/721; 386/54, 126; 84/602

(56) References Cited

U.S. PATENT DOCUMENTS

| | | | | | |
|---|---|---|---|---|---|
| 5,574,905 | A | * | 11/1996 | deCarmo | ........................ 707/1 |
| 5,608,178 | A | * | 3/1997 | Iwase | ........................ 84/609 |
| 5,634,031 | A | * | 5/1997 | Sakuma | ........................ 711/111 |
| 5,805,544 | A | * | 9/1998 | Haneda | ........................ 369/47.23 |
| 5,805,550 | A | * | 9/1998 | Ohmori | ........................ 369/53.21 |
| 6,188,662 | B1 | * | 2/2001 | Maeda et al. | ........................ 369/83 |
| 6,272,279 | B1 | * | 8/2001 | Yokoyama et al. | ........................ 386/52 |
| 6,295,267 | B1 | * | 9/2001 | Takaku et al. | ........................ 369/83 |
| 6,301,203 | B1 | * | 10/2001 | Maeda et al. | ........................ 369/30.1 |
| 6,462,753 | B1 | * | 10/2002 | Koyata et al. | ........................ 345/716 |

* cited by examiner

Primary Examiner—Aristotelis M Psitos
(74) Attorney, Agent, or Firm—Jay H. Maioli

(57) ABSTRACT

A recording medium on which a plurality of programs are collected in a plurality of groups and supervised in this grouped state, wherein when an editing command such as dividing, linking, and erasing the predetermined programs or groups recorded on the recording medium is executed, management data is edited to perform the editing command. The invention provides a solution to meet this request by a recording medium, an editing method and an editing apparatus.

11 Claims, 27 Drawing Sheets

FIG.2D

|  | 16bit | | 16bit | | |
|---|---|---|---|---|---|
| | MSB    LSB | MSB    LSB | MSB    LSB | MSB    LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster · H | Cluster1 | Sector | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| ACCOMMODATING TABLE INDICATING DATA WIDTH | Disk | ID | P-DFA | P-EMPTY | 11 |
| | P-FRA | P-TNO1 | P-TNO2 | P-TNO3 | 12 |
| | P-TNO4 | P-TNO6 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| MANAGEMENT TABLE WIDTH (256 SLOTS) | (01h) START ADDRESS | | | TRACK MODE | 78 |
| | END ADDRESS | | | LINK INFORMATION | 79 |
| | (02h) START ADDRESS | | | TRACK MODE | 80 |
| | END ADDRESS | | | LINK INFORMATION | 81 |
| | (03h) START ADDRESS | | | TRACK MODE | 82 |
| | END ADDRESS | | | LINK INFORMATION | 83 |
| | (FCh) START ADDRESS | | | TRACK MODE | 580 |
| | END ADDRESS | | | LINK INFORMATION | 581 |
| | (FDh) START ADDRESS | | | TRACK MODE | 582 |
| | END ADDRESS | | | LINK INFORMATION | 583 |
| | (FEh) START ADDRESS | | | TRACK MODE | 584 |
| | END ADDRESS | | | LINK INFORMATION | 585 |
| | (FFh) START ADDRESS | | | TRACK MODE | 586 |
| | END ADDRESS | | | LINK INFORMATION | 587 |

U-TOC SECTOR 0

FIG.3

FIG.4A  P - FRA = [ 03h ]

| | START ADDRESS | END ADDRESS | LINK INFORMATION |
|---|---|---|---|
FIG.4B (03h) | S03 | E03 | 18h |
FIG.4C (18h) | S18 | E18 | 1Fh |
FIG.4D (1Fh) | S1F | E1F | 2Bh |
FIG.4E (2Bn) | S2B | E2B | E3H |
FIG.4F (E3h) | SE3 | EE3 | 00h |

| | 16bit | | 16bit | | |
|---|---|---|---|---|---|
| | MSB　　　LSB | MSB　　　LSB | MSB　　　LSB | MSB　　　LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster · H | Cluster2 | Sector | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | 00000000 | 00000000 | 00000000 | 00000000 | 7 |
| | 00000000 | 00000000 | 00000000 | 00000000 | 8 |
| | 00000000 | 00000000 | 00000000 | 00000000 | 9 |
| | 00000000 | 00000000 | 00000000 | 00000000 | 1 |
| | 00000000 | 00000000 | 00000000 | P-EMPTY | 1 |
| | 00000000 | P-TNA1 | P-TNO2 | P-TNA3 | 1 |
| | P-TNA4 | P-TNA5 | P-TNO6 | P-TNA7 | 1 |
| ACCOMMODATING TABLE INDICATING DATA WIDTH | | | | | |
| | P-TNA248 | P-TNA249 | P-TNA250 | P-TNA251 | 7 |
| | P-TNA252 | P-TNA253 | P-TNA254 | P-TNA255 | 7 |
| | DISC NAME | | | | 7 |
| | DISC NAME | | | LINK INFORMATION | 7 |
| (01h) | DISC NAME / TRACK NAME | | | | 7 |
| | DISC NAME / TRACK NAME | | | LINK INFORMATION | 7 |
| (02h) | DISC NAME / TRACK NAME | | | | 8 |
| | DISC NAME / TRACK NAME | | | LINK INFORMATION | 8 |
| CHARACTER TABLE WIDTH (03h) | DISC NAME / TRACK NAME | | | | 8 |
| | DISC NAME / TRACK NAME | | | LINK INFORMATION | 8 |
| (FEh) | DISC NAME / TRACK NAME | | | | 5 |
| | DISC NAME / TRACK NAME | | | LINK INFORMATION | 5 |
| (FFh) | DISC NAME / TRACK NAME | | | | 5 |
| | DISC NAME / TRACK NAME | | | LINK INFORMATION | 5 |

U-TOC SECTOR 1

FIG.5

|    |          |          |           |           |
|----|----------|----------|-----------|-----------|
| 12 | 00000000 | P-TNA 1  | P-TNA 2   | P-TNA 3   |
| 13 | P-TNA 4  | P-TNA 5  | P-TNA 6   | P-TNA 7   |
| 14 | P-TNA 8  | P-TNA 9  | P-TNA 10  | P-TNA 11  |
| .. | ....     | ....     | ....      | ....      |
| .. | ....     | ....     | ....      | ....      |
| 76 | 8        | —        | 1         | 0         |
| 77 | ;        | G        | A         | 00        |
| 78 | 00       | 00       | 00        | 00        |
| 79 | 00       | 00       | 00        | 00        |
| 80 | 00       | 00       | 00        | 00        |
| 81 | 00       | 00       | 00        | 00        |
| .. | ....     | ....     | ....      | ....      |
| .. | ....     | ....     | ....      | ....      |

FIG.10

| | | | | |
|---|---|---|---|---|
| 12 | 00000000 | P-TNA 1 | P-TNA 2 | P-TNA 3 |
| 13 | P-TNA 4 | P-TNA 5 | P-TNA 6 | P-TNA 7 |
| 14 | P-TNA 8 | P-TNA 9 | P-TNA 10 | P-TNA 11 |
| .... | .... | .... | .... | .... |
| .... | .... | .... | .... | .... |
| 76 | 1 | – | 7 | ; |
| 77 | S | O | N | 01 |
| 78 | Y | / | / | 8 |
| 79 | – | 1 | 0 | 02 |
| 80 | ; | G | A | 00 |
| 81 | 00 | 00 | 00 | 00 |
| .... | .... | .... | .... | .... |
| .... | .... | .... | .... | .... |

Byte position of the next slot
=76 × 4+(Link-P) × 8

Byte position of the next slot =76 × 4+(Link-P) × 8

Byte position of the next slot =76 × 4+(Link-P) × 8

RECORDING MEDIUM, EDITING METHOD AND EDITING APPARATUS

This is a division of prior application Ser. No. 09/901,277 filed Jul. 9, 2001.

BACKGROUND OF THE INVENTION

1. Field of the Invention

This invention relates to a recording medium on which a plurality of programs are collected in a plurality of groups and supervised in this grouped state, and an editing method and apparatus for editing, such as dividing/linking/erasing the predetermined programs or groups, recorded on the recording medium.

2. Description of Related Art

An optical disc can be larger in recording capacity than a magnetic disc by two to three order of magnitudes and can be accessed at a higher speed than a tape-shaped recording medium. In addition, the optical disc has merits such as non-contact recording and/or reproduction for a medium and high durability and, for this reason, has recently come to be used extensively.

Among known optical discs, there are, for example, a replay-only optical disc, conforming, as a standard, to the CD-DA (Digital Audio) format, for a standard CD (Compact Disc) having a replay-only area having data recorded in the form of pits, a magneto-optical disc, formed by a magneto-optical recording medium, conforming, as a standard, to the CD-MO (Magneto-Optical) format, as an extension format of the CD-DA format, having a recording and/or reproducing area, and a hybrid disc, including both a replay-only area, having data recorded thereon as pits, and a recording and/or reproducing area for data recording and/or reproduction.

Heretofore, in a disc recording and/or reproducing apparatus for recording data on a disc-shaped recording medium, such as a magneto-optical disc or a hybrid disc, recording is halted by a manual operation whenever the recording data has become useless data in the course of recording. For example, in recording a music air from a compact disc to a magneto-optical disc, recording by a magneto-optical disc recorder is halted by a manual operation after the end of the reproduction by a CD player.

Meanwhile, in a disc-shaped recording medium, such as an optical disc or a magneto-optical disc, there are provided a main data recording area for recording the main data, and a management data area for recording the management data, and the main data recording area is supervised as to a recorded area and a recordable area by management data recorded in the management data area. For example, the optical disc conforming to the CD format includes a data area, having program data, such as performance data, recorded thereon, and a lead-in area provided on its inner rim side. As the table-of-contents (TOC) data, showing the sites of recording and recording contents of the data area, the recorded start address information and the recording end address information for the entire program data are recorded in order in the lead-in area.

The present Assignee has already proposed an MD system for digitally recording and/or reproducing e.g., music signals, using a Mini-Disc (MD, a registered trademark) comprised of an optical disc 64 mm in diameter accommodated in a cartridge. There are three sorts of the Mini-Disc, namely a replay-only optical disc, a recordable optical disc and a hybrid disc comprised of a replay-only area and a recordable area. In an MD system capable of recording main data, a program area and UTOC (User TOC) area are provided in the recordable area of the Mini-Disc and the table of contents data indicating the recording positions and contents of the program arera are recorded in the UTOC area. That is, in the case of the Mini-Disc system, there is recorded the management data, termed UTOC, apart from the main data, such as music data, for supervising the recorded data area, in which the user has made recording on the disc, and a non-recorded area, that is a recordable area. The recording apparatus discriminates an area in which to make recording, as it references this UTOC, whilst the reproducing apparatus discriminates an area to be reproduced as it references the UTOC.

That is, programs etc as each music air recorded are managed in the UTOC in terms of tracks as data units, and the start and end addresses thereof are recorded therein. In a free area in the UTOC, where no recording has been made, there are recorded start and end addresses, as an area in which to record data as from the current time.

In the Mini-Disc system, a disc name, capable of indicating e.g., the disc title as a part of the editing function, and a track name, capable of indicating the title of e.g., a program, recorded in terms of a track or a program as a unit, can be input and registered by a user in accordance with a predetermined operating method. In the Mini-Disc system, the letter information registered as the disc or track name, is stored in a predetermined area on the UTOC, such that, in e.g., reproduction, the letter information stored can be displayed and output by referencing the disc name and the track name of the desired track stored in the UTOC. In the following, the disc name and the track name are collectively referenced as a "name".

By exploiting these functions, the user may register disc or track names and subsequently confirm the registration as the name of the disc loaded in the reproducing apparatus or the name of the track-based music air is demonstrated on a display unit. Meanwhile, in the Mini-Disc system, recording up to the maximum of 80 minutes (160 minutes for monaural recording) is possible by data compression employing the ATRAC (acoustic transferred adapted coding system). Even the recording of the maximum 320 minutes in a LP4 (long playing) mode by employing the ATRAC3 compression system.

In the conventional Mini-Disc system, there is only a concept of managing the entire disc and the music airs, as a recorded management method, so that, if an album of three CDs is recorded in accordance with ATRAC 3, it has not been possible to perform album-based management.

SUMMARY OF THE INVENTION

It is therefore an object of the present invention to provide a recording medium in which plural programs are collectively recorded and managed in plural groups and in which the management data can be edited in case editing commands, such as splitting/linking/erasure for the programs or the groups of programs are issued.

In one aspect, the present invention provides a recording medium in which a plurality of programs are collected into a plurality of groups and are managed and recorded in this form, in which the recording medium includes a program recording area in which the programs are recorded, a first management data recording area in which the first management data for supervising the program names of the plural programs is recorded and a second management data recording area in which the names of the programs collected in the plural groups and the names of the groups are correlated and are recorded as the second management data along with the separating information for separating the program names and the group names.

In another aspect, the present invention provides an editing apparatus for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the apparatus includes operating means for commanding changes in the sequence of predetermined ones of the plural groups and editing means which, in case changes in the sequence of predetermined ones of the plural groups are commanded by the operating means, edits the correlation of the range information of program numbers making up each of a plurality of groups in the second management data and the group names to cause block movement of the predetermined groups.

In still another aspect, the present invention provides an editing apparatus for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the apparatus includes operating means for commanding division of a predetermined program of predetermined ones of the plural groups, and editing means which, in case division of a predetermined program of predetermined ones of the plural groups is commanded by the operating means, edits the correlation of the range information of program numbers making up each of a plurality of groups in the second management data and the group names.

In still another aspect, the present invention provides an editing apparatus for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the apparatus includes operating means for commanding linking of two of the programs making up a predetermined group of the plural groups, and editing means which, in case linking of two of the programs making up a predetermined group of the plural groups is commanded by the operating means, edits the correlation of the range information of program numbers making up each of a plurality of groups in the second management data and the group names.

In another aspect, the present invention provides an editing apparatus for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the apparatus includes operating means for commanding division of a predetermined group of the plural groups into two, and editing means which, in case division of the predetermined group is commanded by the operating means, edits the correlation of the range information of program numbers making up each of a plurality of groups in the second management data and the group names.

In still another aspect, the present invention provides an editing apparatus for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the apparatus includes operating means for commanding linking of predetermined ones of the plural groups, and editing means which, in case linking of predetermined ones of the plural groups is commanded by the operating means, edits the correlation of the range information of program numbers making up each of a plurality of groups in the second management data and the group names to cause block movement of the predetermined groups.

In still another aspect, the present invention provides an editing apparatus for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the apparatus includes operating means for commanding block erasure of predetermined ones of the plural groups, and editing means which, in case block erasure of predetermined ones of the plural groups is commanded by the operating means, edits the correlation of the range information of program numbers making up each of a plurality of groups in the second management data and the group.

In still another aspect, the present invention provides an editing method for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the method includes an operating step for commanding changes in the sequence of predetermined ones of the plural group, and an editing step which, in case changes in the sequence of predetermined ones of the plural groups are commanded by the operating step, edits the correlation of the range information of program numbers making up each of a plurality of groups in the second management data and the group names to cause block movement of the predetermined groups.

In still another aspect, the present invention provides an editing method for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the method includes an operating step for commanding division of a predetermined program of predetermined ones of the plural groups, and an editing step which, in case division of a predetermined program of predetermined ones of the plural groups is commanded by the operating step, edits the correlation of the range information of program numbers making up each of a plurality of groups in the second management data and the group names.

In still another aspect, the present invention provides an editing method for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the method includes an operating step for commanding linking of two of the programs making up a predetermined group of the plural groups, and an editing step which, in case linking of two of the programs making up a predetermined group of the plural groups is commanded by the operating step, edits the correlation of the range information of program numbers making up each of a plurality of groups in the second management data and the group names.

In still another aspect, the present invention provides an editing method for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the method includes an operating step for commanding division of a predetermined group of the plural groups into two and an editing step which, in case division of the predetermined group is commanded by the operating step, edits the correlation of the range information of program numbers making up each of a plurality of groups in the second management data and the group names.

In still another aspect, the present invention provides an editing method for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the method includes an operating step for commanding linking of predetermined ones of the plural groups, and an editing step which, in case linking of predetermined ones of the plural groups is commanded by the operating step, edits the correlation of the range information of program numbers making up each of a plurality of groups in the second management data and the group names to cause block movement of the predetermined groups.

In yet another aspect, the present invention provides an editing method for editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, in which the method includes an operating step for commanding block erasure of predetermined ones of the plural groups, and an editing step which, in case block erasure of predetermined ones of the plural groups is commanded by the operating step, edits the correlation of the range information of program numbers making up each of a plurality of groups in the second management data and the group.

According to the present invention, as described above, a recording medium is provided which includes a program area in which to record plural programs, and a management area in which to record the second management data for supervising the group name associated with each group into which the plural programs recorded in the program area is collected. The second management data, recorded in the management area, is made up of the range information of the program numbers making up the group, special codes partitioning the respective group names, and the group names, so that the programs recorded in the recording medium can be supervised as plural groups.

According to the present invention, if, in editing a program recorded on a recording medium including a program area for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, a change in the sequence is commanded to predetermined groups in the plural groups, the correlation between the range information of the program numbers making up the groups in the second management data and the group names is edited to effect block movement of the predetermined groups to supervise the programs recorded in the recording medium to effect group-based movement.

According to the present invention, if, in editing a program recorded on a recording medium including a program area for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, a predetermined program forming the predetermined groups in the plural groups is commanded to be split, the correlation between the range information of the program numbers making up the groups in the second management data and the group names is edited to supervise the programs recorded in the recording medium as plural groups to effect the editing of dividing the program in the group.

According to the present invention, if, in editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, two of the programs forming the predetermined groups in the plural groups are linked, the correlation between the range information of the program numbers making up the groups in the second management data and the group names is edited to supervise the programs recorded in the recording medium as plural groups to effect the editing of linking the two programs in the group.

According to the present invention, if, in editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, a predetermined group is commanded to be split into two, the correlation between the range information of the program numbers making up the group in the second management data and the group name is edited to supervise the programs recorded in the recording medium as plural groups to effect the editing of dividing the group into two portions.

According to the present invention, if, in editing a program recorded on a recording medium including a program area for recording a plurality of programs for recording a plurality of programs, and a management area, having recorded therein the first management data for managing the program names for respective programs recorded in the program area, and the second management data, made up of the range information of program numbers making up each of a plurality of groups into which the plural programs recorded in the program area are collected, special codes partitioning the groups from one another, and group names, predetermined groups are commanded to be linked together, the correlation between the range information of the program numbers making up the groups in the second management data and the group names is edited to supervise the programs recorded in the recording medium as plural groups to effect the editing of linking the groups together.

According to the present invention, if, in editing a program recorded on a recording medium including a program area for recording a plurality of programs for recording a plurality of programs, and a management area, having recorded therein the first management data for managing the program names for respective programs recorded in the program area, and the second management data,
made up of the range information of program numbers making up each of a plurality of groups into which the plural programs recorded in the program area are collected, special codes partitioning the groups from one another, and group names, predetermined groups are commanded to be erased in a block, the correlation between the range information of the program numbers making up the groups in the second management data and the group names is edited to supervise the programs recorded in the recording medium as plural groups to effect the editing of block group-based erasure.

BRIEF DESCRIPTION OF THE DRAWINGS

FIG. 3 illustrates a UTOC sector 0 of the Mini-Disc.

FIG. 4 illustrates a link configuration of UTOC sector 0 of the Mini-Disc.

FIG. 5 illustrates a UTOC sector 1 of the Mini-Disc

FIG. 10 is a schematic view showing a typical example of registration contents of a disc name area in case the registration processing in the disc name area in case of performing registration processing in the disc name area.

DESCRIPTION OF THE PREFERRED EMBODIMENTS

Figure 1:
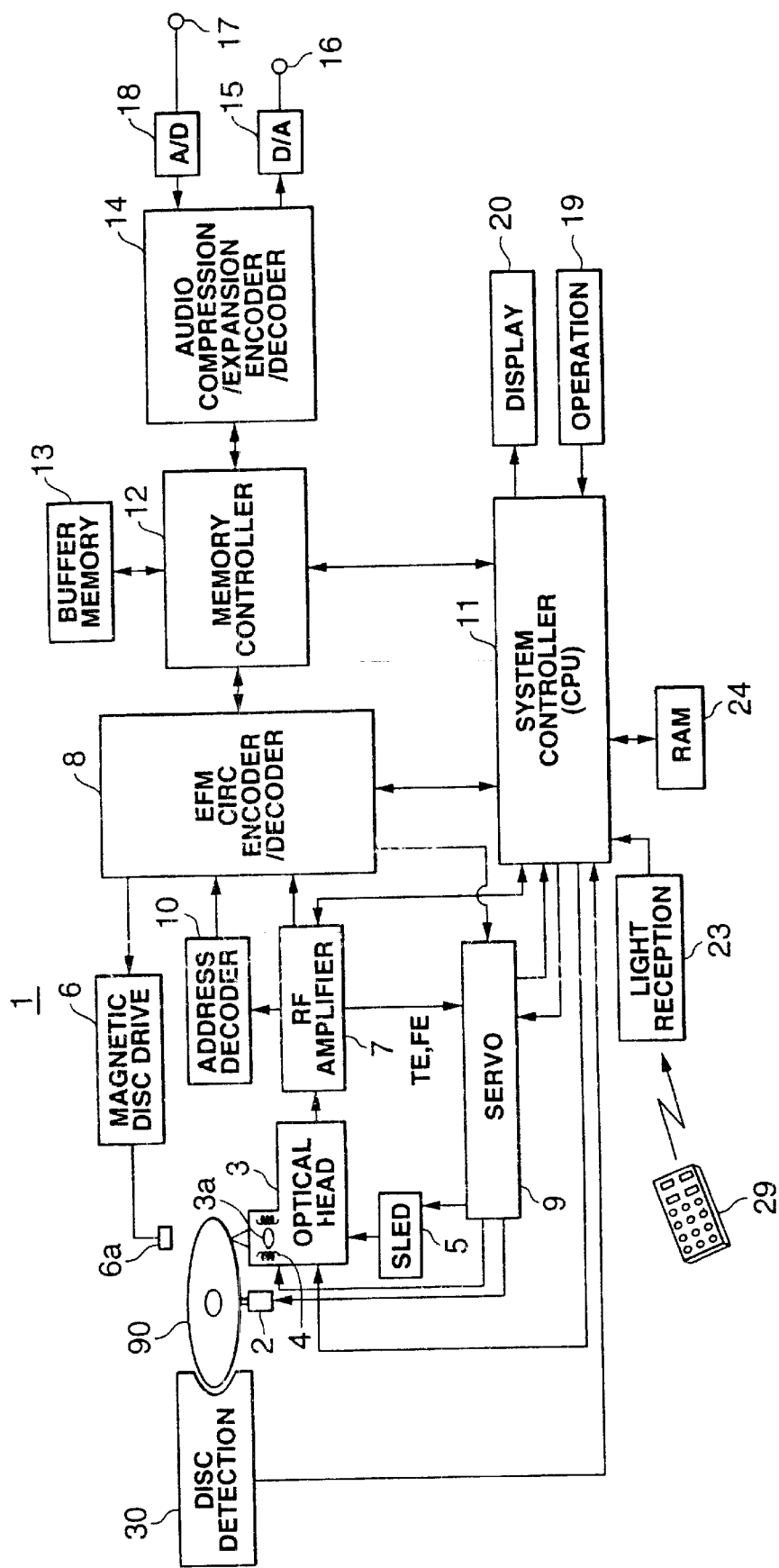
FIG. 1 is a block diagram showing the structure of an MD player embodying the present invention.

Referring to the drawings, preferred embodiments of the present invention will be explained in detail.

The present invention is applied to an MD recorder 1 shown for example in the block diagram of FIG. 1.

The MD recorder 1 is capable of recording and/or reproducing speech data on or from a magneto-optical disc (MD; Mini-Disc, a registered trademark) 90.

A magneto-optical disc 90, housed in a cartridge, is configured for being irradiated with the light from an optical head 3 as an optical pickup or applying a magnetic field from a magnetic head by opening/closing a shutter mechanism provided in the cartridge in recording and/or reproduction.

The magneto-optical disc 90 is run in rotation at a CLV (constant linear velocity) by a spindle motor 2.

In the present embodiment, a disc detection unit 30 is provided for detecting the loading/unloading state of the magneto-optical disc 90 with respect to the loading position of the magneto-optical disc 90 in the MD recorder 1. It is sufficient if the disc detection unit 30 is able to detect the possible loading of the magneto-optical disc 90.

There is no particular limitation to the specified structure of the disc detection unit 30. For example, the disc detection unit 30 may be a mechanical switch thrust or opened by the cartridge of the magneto-optical disc 90 as the magneto-optical disc 90 is in the loaded state, or may be a photo-interrupter that is able to detect the possible presence of the magneto-optical disc 90.

It is also possible to detect the possible loading of the disc based on a signal derived from the reflection of the laser light radiated from the optical head 3 as now explained.

The optical head 3 is mounted in a facing relation to a magnetic head 6a with the loaded magneto-optical disc 90 in-between. The optical head 3 is made up of an objective lens 3a, a bi-axial mechanism 4, a semiconductor laser, not shown, and a light reception unit for receiving the light radiated by the semiconductor laser and reflected by the magneto-optical disc surface.

The bi-axial mechanism 4 includes a focusing coil for driving the objective lens 3a in a direction towards and away from the magneto-optical disc 90 and a tracking coil for driving the objective lens 3a radially of the magneto-optical disc.

There is also provided a sled mechanism 5 for causing marked movement of the optical head 3 in its entirety along the radial direction of the magneto-optical disc 90.

The reflected light information, detected by the light receiving section in the optical head 3, is sent to an RF amplifier 7. Following current/voltage conversion, the matrix processing is executed to generate focusing error signals FE and tracking error signals TE as well as RF signals.

When the light is illuminated on the magneto-optical disc 90 at a laser power lower than that in recording, the magnetic field vector is detected by exploiting the magnetic Kerr effect of the reflected light to generate the RF signals, as replay signals, based on the detected magnetic field vector.

The focusing error signals FE and the tracking error signals Te, generated by the RF amplifier 7, are processed by a servo circuit 9 with phase adjustment or gain adjustment, and subsequently applied to the focusing coil and to the tracking coil of the bi-axial mechanism 4 via a driving amplifier, not shown.

From the tracking error signals TE, sled error signals are generated in the sled mechanism 5 in the servo circuit 9 so as to be applied via a sled drive amplifier to the sled mechanism 5.

The RF signals, generated by the RF amplifier 7, are binary-coded by an EFM/CIRC encoder/decoder 8 and demodulated for EFM (eight-to-fourteen modulation) while being corrected for errors with CIRC (cross-interleave read-Solomon coding) so as to be supplied to a memory controller 12.

On the magneto-optical disc 90 are tormed grooves with a meandering at a predetermined frequency to record address data by frequency modulation. The predetermined meandering frequency of the grooves is 22.05 kHz.

These address data may be extracted by frequency demodulation via a band-pass filter in an address decoder 10 adapted for passing only the predetermined frequency.

The EFM/CIRC encoder/decoder 8 generates binary-coded EFM signals or spindle error signals for rotationally controlling the disc based on an address decoder, as extracted from the address decoder, to apply the so-generated spindle error signals through the servo circuit 9 to the spindle motor 2.

Moreover, the EFM/CIRC encoder/decoder 8 controls the pull-in operation of the phase-locked loop, based on the binary-coded EFM signals, to generate spindle error signals for rotationally controlling the disc to apply the so-generated spindle error signals on the spindle motor 2.

The error-corrected binary-coded data is written by the memory controlling 12 in a buffer memory 13.

When more than a predetermined amount of data stored in the buffer memory 13, memory controller 12 reads out data from the buffer memory 13 at a transfer rate sufficiently slower than the write transfer rate and outputs data as audio data.

The data is stored first in the buffer memory 13 and subsequently output as audio data, so that, if unnecessary track jumps occur against disturbances, such as vibrations, such that continuous data read-out from the optical head 3 is interrupted, data corresponding to the data for the time necessary for re-arrangement of the optical head 3 to an address where the track jump has occurred is pre-stored in the buffer memory 13, thus realizing the continuous audio signal outputting without sound interruptions.

In the present embodiment, if a 4-Mbyte RAM is used as the buffer memory 13, audio data continuing for about 10 seconds can be stored in the state of the buffer memory 13 fully charged with data.

Meanwhile, the operation of the memory controller 12 is controlled by a system controller 11.

The data read-out from the magneto-optical disc 90 has been compressed in recording in accordance with a predetermined compression method, herein the ATRAC (Acoustic Transferred Adapted Coding) system. The data read out from the buffer memory 13 under control by the memory controller 12 is decompressed by an audio compression encoder—expansion decoder 14 into decompressed digital data which then is applied to a D/A converter 15.

The D/A converter 15 converts the digital data, decompressed by the audio compression encoder—expansion decoder 14, into analog audio signals, which are sent at an output terminal 16 to a replay output system, such as amplifier, loudspeaker and a headphone, not shown, so as to be output as replay audio signals.

In the above-described replay operation, the system controller 11 is responsive to the operation by an operating unit 19 to transfer various servo commands to the servo circuit 9, command the memory controller 12 to control the buffer memory 13, perform control to cause a display unit 20, display the letter information, such as the play time elapsed or the title of the program being reproduced, or to perform control such as spindle servo or decoding processing control in the EFM/CIRC encoder/decoder 8.

There is also provided a remote commander 29 for outputting commands responsive to the user operations as e.g., the IR modulation signals. This command, that is the operating information, is converted by an IR receiving unit 23 into electrical signals, which are routed to the system controller 11. The system controller then performs necessary control processing responsive to the operational information from the IR receiving unit 23.

If, in this MD recorder 1, audio data, such as music air, is to be recorded on the magneto-optical disc 90, the audio signals are supplied to an input terminal 17.

The analog audio signals, output from an analog output terminal of the reproducing apparatus, such as a CD player, are input to the input terminal 17, and converted by an A/D converter 18 into digital signals, which are sent to the audio compression encoder—expansion decoder 14.

The digital audio signals, input to the audio compression encoder—expansion decoder 14, are compression-coded in accordance with the ATRAC (Acoustic Transferred Adapted Coding) 3 system. The compressed digital audio signals are temporarily stored via memory controller 12 in the buffer memory 13.

The memory controller 12 detects that a predetermined amount of the compressed data have been stored in the buffer memory 13 and permits the data to be read out from the buffer memory 13.

The compressed data read out from the buffer memory 13 are processed by the EFM/CIRC encoder/decoder 8 with e.g., error code appendage or EFM and thence supplied to a magnetic head driving circuit 6.

The magnetic head driving circuit 6 is responsive to the data supplied thereto to apply a magnetic field of N or S poles of the magnetic head 6a.

In recording for applying the magnetic field in this manner, the system controller 11 controls the radiating power of the semiconductor laser, not shown, of the optical head 3, to heat the magneto-optical disc surface up to the Curie temperature. This attaches the magnetic field information applied from the magnetic head 6a to the disc recording surface to record data as the magnetic field information.

In recording, the system controller 11 transfers various servo commands to the servo circuit 9, issues control commands to the buffer memory 13 to the memory controller 12, performs control to cause the display unit 20 to demonstrate e.g., the track number of the program being recorded or the elapsed recording time, or performs encoding or servo control in the EFM/CIRC encoder/decoder 8.

This MD recorder 1 is able to record music air or track as program as audio data, the letter information, such as letter information for the entire disc, such as the letter information, e.g., the track name or disc name, in addition to the audio data.

In order for the user to input the letter information by way of name registration, the operating unit 19 includes a letter selection unit, such as an operating dial, and a decision key for determining the input letter string to terminate the letter inputting operation.

The remote commander 29 is provided with alphabet keys from A to Z, space key -, symbol keys such as ? or // and ten keys for inputting numerical figures, in order to enable letter inputting with the aid of the remote commander 29. The remote commander 29 is also provided with a decision key for determining the input letter string, using these keys, or to terminate the letter inputting.

The system controller 11 holds letters input from the operating unit 19 or the remote commander 29 on the RAM 24. When the letter string is determined by the decision operation, the system controller 11 registers the letter string in a state matched to the program selected for the time being.

The program selected for the time being is the program being then reproduced, recorded or paused. If such state is not prevalent, with the program not being selected, the input letter string is handled as being the letter information for the entire disc.

The letter information registered is written on the magneto-optical disc 90 as data of the UTOC sector 1, as later explained, so as to be finalized on the magneto-optical disc 90. The UTOC data is updated at a predetermined timing following the recording operation or the letter inputting operation.

However, in recording and/or reproducing the magneto-optical disc 90, it is necessary to read out the management data recorded on the magneto-optical disc 90, that is, the PTOC (pre-mastered TOC) or the UTOC (user TOC). The system controller 11 then discriminates an address for an area for recording or and an address of an area to be reproduced.

This management data is held in the buffer memory 13. To this end, the buffer memory 13 is partitioned into a buffer area used as a data area for recording and/or reproducing data and a TOC area for holding the management data.

The system controller 11 reads out the management data by the operation of reproducing the innermost rim of the disc carrying the recorded management data on loading the magneto-optical disc 90 to store the read-out information in the buffer memory 13 so as to be referenced in the course of the recording/reproducing/editing of the magneto-optical disc 90.

Meanwhile, the UTOC is rewritten for data recording or a variety of editing operations. In each recording/editing operation, the system controller 11 performs UTOC updating processing on the UTOC information stored in the buffer memory 13 and, responsive to the rewriting operation, rewrites the UTOC area of the magneto-optical disc 90 at a predetermined timing.

That is, when the user has input the letter information for name registration, the input letter information as the disc name or the track name is held on the RAM 24. When the letter input has become finalized, the management data in the buffer memory 13 is updated by exploiting the letter information in the RAM 24. This management data is written at a predetermined timing in the UTOC area of the magneto-optical disc 90 to update the UTOC contents of the magneto-optical disc 90.

In the present embodiment, since the letter information as the name is obtained by the editing operation performed by the user, as the letter inputting operation for name registration, it may be said to be the editing information in the management data.

Moreover, in the present embodiment, in which the TOC letter information area is set in the RAM 24 based on the above structure, name letter inputting and editing may be carried out not only on the magneto-optical disc 90 loaded on the MD recorder 1 but also on the magneto-optical disc 90 not loaded on the MD recorder 1, as will be explained subsequently in detail.

A cluster format of the recording data track on the magneto-optical disc 90 is now explained.

The recording operation in the Mini-Disc system is performed in terms of a cluster as unit. The format for the cluster is shown in FIGS. 2A, 2B, 2C, 2D and 2E.

Figure 2A:
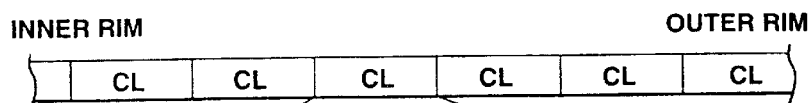
FIG. 2 illustrates a cluster format of a Mini-Disc.

As the recording track in the Mini-Disc system, plural clusters CL are formed contiguously, as shown in FIG. 2A, with one cluster being the minimum recording unit. Each cluster corresponds to two to three cycles of tracks.

Figure 2B:
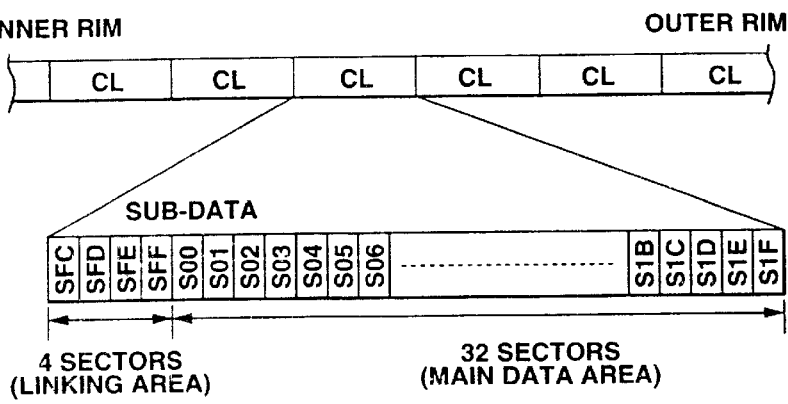

Referring to FIG. 2B, each cluster CL is made up of a sub-data area of four sectors SFC to SFF and the main data area of 32 sectors S00 to S1F. In audio data, the main data is audio data compressed by ATRAC processing.

One sector is a data unit made up of 2352 bytes.

The 4-sector sub-data area is used for sub-data or as a linking area, while the 32-sector main data area is used for recording TOC and audio data. The sectors of the linking area are throw-out sectors for matching the longer interleaving length, used herein, of the CIRC to the sector length of 13.3 msec as used for error correction in e.g., a CD, and basically represent a reserve area. However, these sectors may also be used for some processing or other or for recording some control data or other.

Meanwhile, addresses are recorded on the sector basis.

Figure 2C:
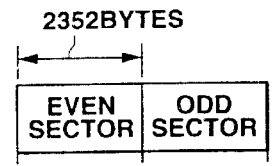

Each sector is subdivided into sound groups, as shown in FIG. 2C, while two sectors are subdivided into 11 sound groups, as shown in FIG. 2D.

That is, as shown in FIGS. 2A, 2B, 2C and 2D, the sound groups SG00 to SG0A are comprised in two consecutive sectors, made up of an even sector, such as sector S00, and an odd sector, such as sector S01. Each sound group is made up of 424 bytes, and corresponds to the sound data volume corresponding to 11.61 msec.

Figure 2E:
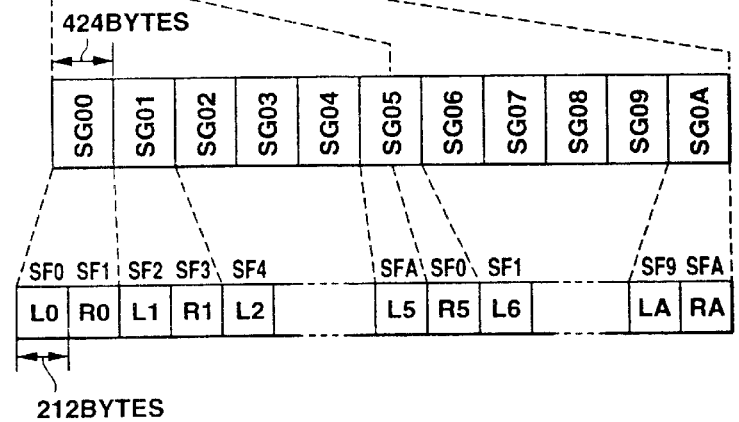

Referring to FIG. 2E, data are recorded in L and R channels within one sound group SG, as shown in FIG. 2E. For example, the sound group SG00 is made up of L-channel data L0 and R-channel data R0, whilst the sound group SG01 is made up of L-channel data L1 and R-channel data R1.

Meanwhile, 212 bytes which become the data area of the L-R channel are called a sound trame.

The cluster format, explained in FIGS. 2A, 2B, 2C and 2D, is formed in the entire area of the magneto-optical disc 90, which is divided in the radial direction into a radially inner area as a management area and into a program area contiguous to the management area.

In the radially inner disc area, there is provided a replay-only area in which replay-only data are recorded in the form of phase pits. Next to the replay-only area, there is recorded the photo-magnetically recordable and/or reproducible area. The management area is provided on the innermost areas of the replay-only area and the photomagnetic area.

In the program area, formed consecutively to the management area of the photomagnetic area, audio data are recorded in each sector of the main data area of the program area shown in FIGS. 2A to 2D.

As the management area, a PTOC (pre-mastered TOC) for area management of the entire disc is provided in the replay-only area. In the management area in the photomagnetic area contiguous to the replay-only area, there is recorded the UTOC (user table-of-contents) information used for supervising the respective programs as audio data of e.g., music airs recorded in the program area.

A UTOC sector, as the management data for supervising the recording and/or reproducing operation of a track corresponding to the program of e.g., the music airs in the magneto-optical disc 90, is now explained.

FIG. 3 shows the format of for UTOC sector 0.

As the UTOC sectors, sectors from sector 0 up to sector 31 may be provided. That is, each of the sectors S00 to S1F of one cluster in the management area may be used. The sectors 1, 4 are the areas for the letter information, whilst the sector 2 is an area for recording the recording date and time.

The UTOC sector 0 is mainly the data management area where there is recorded the management data on the free area in which the user has made recording and in which a program can be newly recorded. That is, in the sector 0, a start address as a start point or an end address as an end point of each program recorded in the program area, the copying protection information as a track mode representing the properties of each program, and the emphasis information, are supervised.

For example, if a music air is to be recorded on the disc 1, the system controller 11 finds out the free area on the disc, from the UTOC sector 0, to record the audio data therein. In replay, the area in which the music air to be reproduced has been recorded is discriminated from the UTOC sector 0, and is accessed for reproduction.

Referring to FIG. 3, there are recorded in the UTOC sector 0, in continuation to the header portion forming a sync pattern with 12 bytes, "cluster H", "cluster L" and "sector", as three byte data representing the address of the sector, a maker code "maker code" representing the disc producer, a model code "model code", a first program number "first TNO", the last program number "last TNO", the sector using state, the disc serial number "disc serial No." and the disc ID, by way of an example.

There are also recorded a pointer P-DFA (pointer for defective area) indicating the leading position of the slot in which to store the defect position produced on the disc, the pointer-EMPTY (pointer for EMPTY slot), indicating the slot using state, pointer P-ERA (pointer for free area), indicating the leading position of the slot supervising the recordable area and accommodating table indicating data made up of pointer P-TNO1, P-TNO2, . . . , P-TNO255 indicating the leading position of the slot associated with the respective program numbers.

Next, a management table having 255 of 8-byte slots is provided. In each slot, the start address, end address, track mode and the link information are supervised.

In the present magneto-optical disc 90, it is unnecessary to record the data consecutively but sequential data strings may be recorded discretely, that is as plural parts, on the recording medium. Meanwhile, the parts denote temporally consecutive data recorded in physically consecutive clusters.

That is, the reproducing apparatus, adapted for coping with the magneto-optical disc 90, is designed so that the data are transiently recorded in the buffer memory 13, and so that the write rate and the readout rate to or from the buffer memory 13 are varied, in a manner as described above. Thus, the optical head 3 may be caused to sequentially access data discretely recorded on the magneto-optical disc 90 to memorize the data in the buffer memory 13 to restore the stored data into the sequential data string on the buffer memory 13.

With this structure, continuous speech reproduction is not obstructed because the write rate is faster than the readout rate in the buffer memory 13 during reproduction.

Moreover, if the program shorter than the recorded program is overwritten on the pre-recorded program, any redundant portion may be specified as a recordable area managed from the pointer P-FRA without being erased to utilize the recording capacity efficiently.

Using the case of the pointer P-FRA supervising the recordable area, the method for linking the discrete areas is explained with reference to FIGS. 4A to 4F.

Referring to FIG. 4A, if a value such as 03 h (hexadecimal) is recorded in a pointer P-FRA indicating the leading position of the slot supervising the recordable area, the slot corresponding to this "03 h" is accessed. That is, the data of the slot 03 h in the management table is read.

Referring to FIG. 4B, the start and end addresses, recorded in the slot 03 h, indicate the beginning and end points of a part recorded on the disc.

The link information recorded in the slot 03 h indicates an address of the slot which is to come next. In this case, 18 h is recorded.

Referring to FIG. 4C, the link information recorded in the slot 18 h is traced to access the slot 2 Bh shown in FIG. 4E to grasp the starting and end points of a part of the disc as the start and end addresses recorded in the slot 2 Bh.

In similar manner, the link information is traced until appearance of data "00 h" shown in FIG. 4F to grasp the addresses of the entire parts managed from the pointer P-FRA.

Thus, the slots are traced until the link information is 00 h indicating null, with the slot indicated by the pointer P-FRA as a starting point, whereby the parts discretely recorded on the disc can be linked on the memory. In such case, the totality of parts as the recordable area on the magneto-optical disc 90 can be grasped.

In the present embodiment, the pointer P-FRA is taken as an example. In similar manner, the pointers P-DFA, P-EMPTY, P-TNO1, P-TNO2, . . . , P-TNO255, may also be supervised by linking discrete parts.

FIG. 5 shows the format of the UTOC sector 1.

In the UTOC sector 1, the disc title, for example, is managed as the letter information associated with respective programs recorded in the program area and as the letter information associated with the entire magneto-optical disc.

If the program recorded is audio data, the disc title is the information such as the album title or the performer's name, while the letter information associated with each program is the information such as the name of the music air. For registering the letter information, the user optionally sets and inputs a letter.

The letter information for each program is recorded in a slot in a letter table specified by a pointer P-TNA(x) of the accommodating table indicating data within a range from 1 to 255. Although the 7-byte letter information can be recorded in one slot, plural slots may be linked in recording, using the link information, if there are many letters.

In the UTOC sector 2, the recording time and date for each program, recorded in the program area, is managed in similar manner.

In the UTOC sector 4, katakana and kanji are managed as in FIG. 5 so that these characters can be used as the fonts of the letter information, such as titles of the programs recorded in the program area or the title of the entire magneto-optical disc.

The illustrative structures of the buffer memory 13 and the RAM 24 provided in the MD recorder 1 of the present embodiment are hereinafter explained.

Figure 6A:
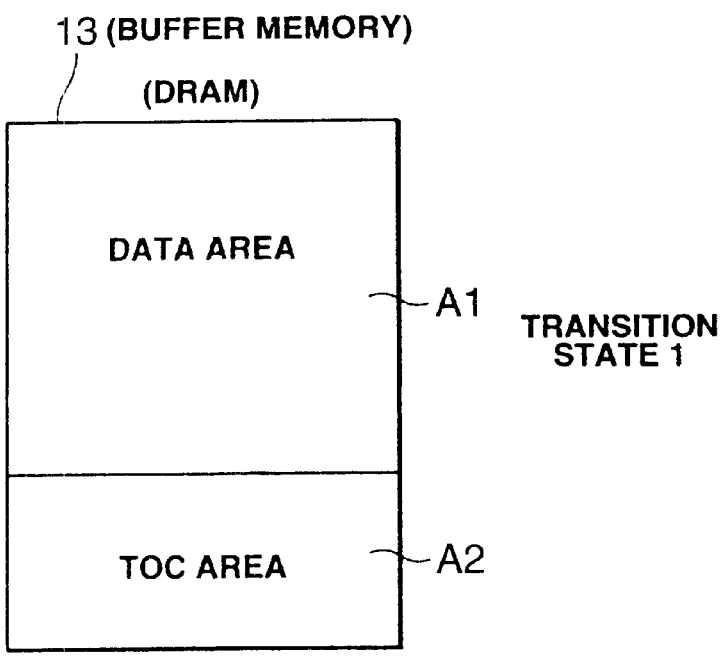
FIG. 6 illustrates a data allocation structure of RAM provided in a system controller and a buffer memory in the MD recorder.

Referring to FIG. 6A, there are separately set in the buffer memory 13 a data area A1, where the recording data/replay data are stored, and a TOC area A2, where the management data on the recording data/replay data are stored.

As aforesaid, the TOC area A1 is an area in which PTOC and UTOC as management data read out from the magneto-optical disc 90, loaded on the MD recorder 1, is stored, and in which the management data is sequentially updated in accordance with the editing operations, such as recording operation or name registration.

Figure 6B:
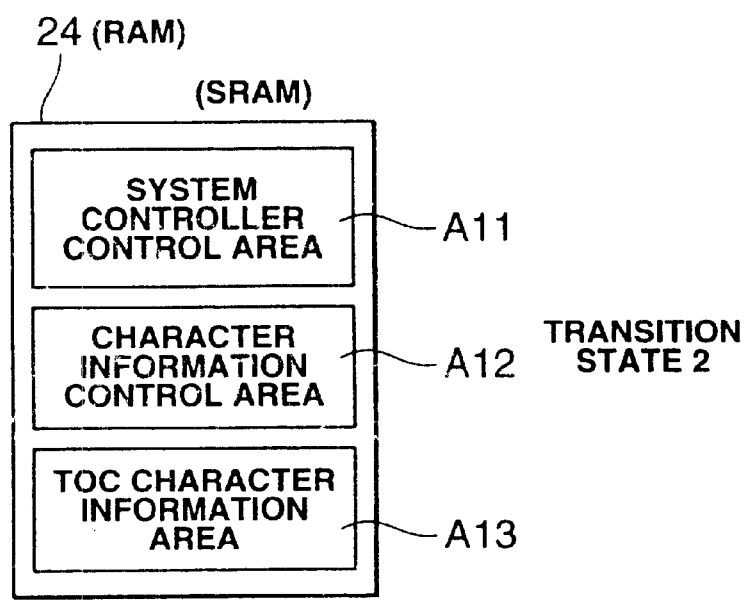

Referring to FIG. 6B, the RAM 24 is split into three areas of a system controller control area A11, a letter information control area A12, and a TOC letter information area A13.

The system controller control area A11 is an area in which the information such as program data used when the system controller 11 executes a variety of control processing operations or the results of calculations obtained by the control processing operations executed are sequentially stored.

The letter information control area A12 is an area se as a working area used in case of performing an editing operation of creating or changing the name by the input letter information in accordance with the operation of inputting the letter information for name editing executed by the user.

The TOC letter information area A13 is an area in which to store the letter information as the track or disc name as finalized by the processing for name registration.

Although there is no particular limitation to the memory device forming the buffer memory 13 and the RAM 24, the buffer memory 13, for example, may be formed by a DRAM (dynamic random access memory) for cost saving in view that a larger volume of the recording data/replay data are stored in the buffer memory 13.

On the other hand, the RAM 24 is not in need of a larger capacity and hence may be formed by an SRAM (static random access memory) without being conscious of expenses.

In the present MD recorder 1, album names are stated in the disc name areas of the UTOC sector 1, for supervising the music airs recorded on the disc 90 in plural groups, in accordance with the following principles (A), (B) and (C):

(A) The first and last program numbers "First TNO" and "Last TNO" in an album are stated with a special code "-" in-between, or the program numbers are stated by partitioning with a numbers "First TNO" and "Last TNO" in an album are stated with a special code ";" in-between. Meanwhile, the style of stating the program numbers with the special code "-" may co-exist with the style of stating the program numbers with a special code ";".

(B) The program number and the album name are separated from each other with the special code ";" in-between.

(C) The different albums are partitioned from each other by a special code "//", while the same special code "//" is placed at back of the last album name.

If three albums, namely a program number (n1–n2), an album name 1, a program number (n2–n4), an album name 2, a program number (n5–n6) and an album name 3 are recorded, "n1–n2; album name 1//n2–n4; album name 2//n5–n6; album name 3" is stated as an album name in the disc name area of the UTOC sector 1.

The album-based program number TNO belongs to the range from First TNO to Last TNO and, although lacking numbers are tolerated, the program number must increase incessantly.

For example, if a program number (n1–n2), an album name 1, a program number (n3, n5, n10), album name 2, program numbers (n12–n15) and the album name 3 are recorded, "n1–n2; album name 1//3, n5, n10; album name 2//n12–n15, n17; album name 3//" is stated as an album name. In this case, there is recorded the program in the range from n1 to n2 in the album name 1, while there is recorded in the album name 2 the program for n3, n5 and n20, such that the program in the range from album names n12 to n15 and the program n17 are recorded in the album name 2.

Allowance is made for tracks not belonging to any tracks.

It is also possible that one track be registered in plural albums. In this case, only one track is recorded, only the registration in the album is overlapping. By so doing, unneeded tracks are not recorded such that the recording capacity in the recording medium is saved to enable recording of a larger number of tracks.

In an album formed by a sole track, the special code "-" between the program numbers TNOs may be omitted.

When stating the disc name inclusive of the entire albums and the track-name, TNO=0 is stated first at a leading end.

Allowance is made for a blank album name null.

Allowance is also made for the use of "-" and "/".

Overlapped album names in one disc is allowed.

It is possible to simplify the processing by providing the following limitations.

It is noted that a sole album is formed only by a set of tracks indicated by consecutive program numbers.

A given one of the tracks is registered only in one album.

If the above conditions are used, and if, in a disc bearing the disc name "collections", an album with an album name "Ted Zeppelin_Presence" is recorded in the track numbers TR 1 to 7, an album with an album name "Dream Come True" is recorded in the track numbers TR 8 to 17, an album with an album name "Hikaru Utade/Automatic" is recorded in the track numbers TR 18 to 24, track numbers TR25, TR26 are unrecorded, an album with an album name "null-unnamed" is recorded in the track numbers TR 27 to 30, an album with an album name "1999–2000; My Favorites" is recorded in the track numbers TR 31 to 38, an album with an album name "Love is Over" is recorded in the track number TR 39, track number TR40 is unrecorded, and an album with an album name "Love is Over" is recorded in the track number TR 41, the following description is made in the disc name area of the UTOC sector 1:

0; collections //1–7; Ted Zeppelin "Presence"//8–17; Dream Come True//18–24; Hikaru Utade/Automatic//27–30; //31–38; 1999–2000; My Favorites//39; Love is Over//41—41; Love is Over.

That is, the magneto-optical disc 90, the information for which is recorded and/or reproduced by this MD recorder 1, includes a management area utilized as a disc name area of the UTOC sector 1 in which are recorded the first management data and the second management data. The first management data supervises the program area for recording plural programs and the program name associated with each program recorded in the program area, and the second management data collects the plural programs recorded in the program area in plural groups corresponding to the album to supervise the group name corresponding to the name of the grouped albums. The second management data recorded in the management area of the magneto-optical disc 90, the information for which is recorded and/or reproduced by the MD recorder 1, is made up of "n1–n2" as the range information for the program numbers making up the group, a special code "//" separating the group names corresponding to the plural album names and the group name corresponding to the album name. The second management data includes a disc name as the label name of the recording medium itself of the magneto-optical disc 90.

Stated differently, the management data supervising one or more groups demarcates the first management area supervising respective groups by separating symbols "//". In each first management data, the second management data supervising the program forming each group is demarcated from the third management data supervising the name of each group by separating symbols ";" for management.

In this MD recorder 1, the second management data formed by the range information "n1–n2" of the program numbers forming the group corresponding to the album, the special code "//" demarcating the plural group names corresponding to the album names and the group names is recorded in the disc name area of the UTOC sector 1 of the magneto-optical disc 90 to supervise the programs recorded in the program area to supervise the plural programs recorded in the program area as plural groups to perform editing processing.

Figure 7:
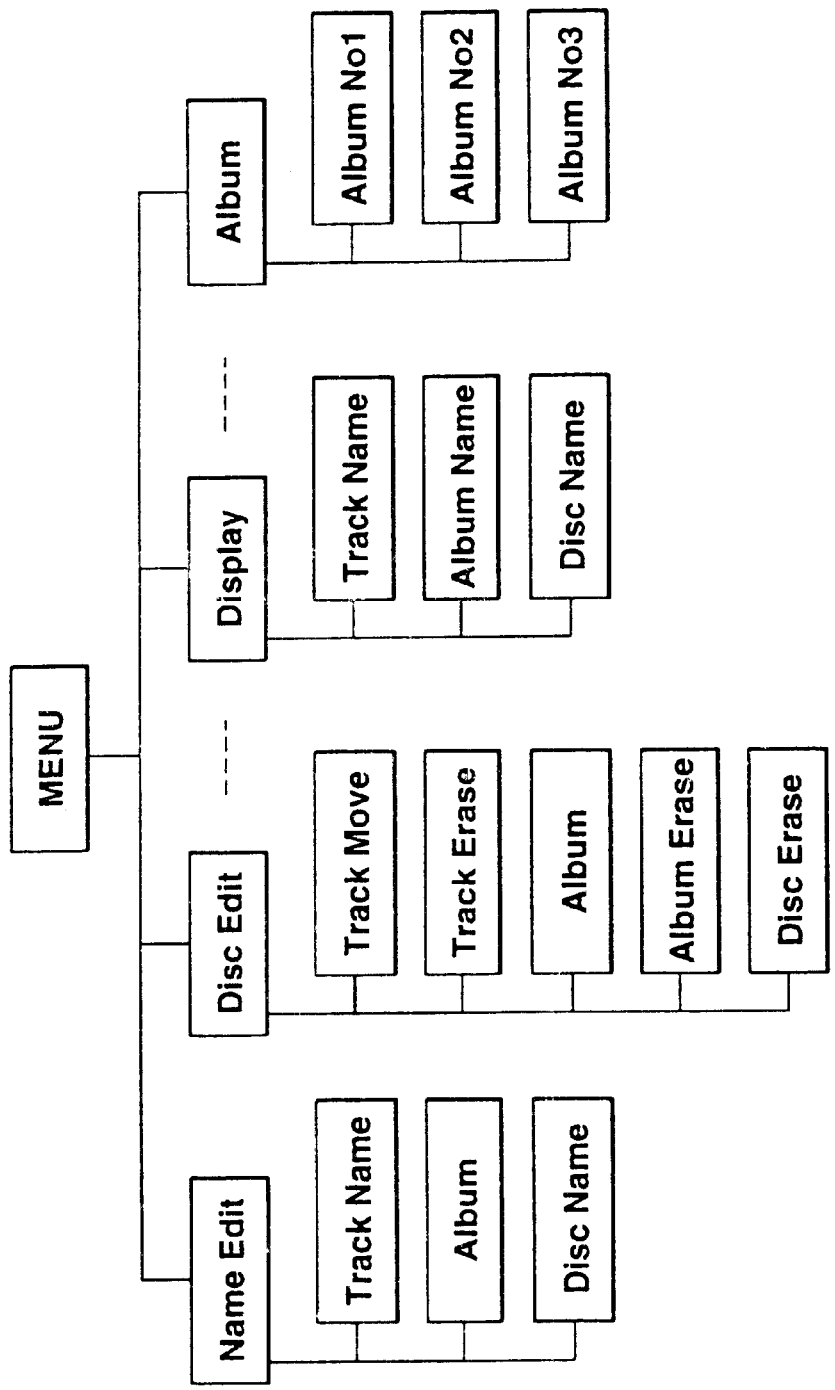
FIG. 7 shows the contents of a menu display in the MD recorder.

That is, the system controller 11 in this MD recorder 1 has the following functions based on the group information corresponding to the so-supervised album name. The system controller 11 displays the menu, shown in FIG. 7, in the display unit 20 and, responsive to the input from the operating unit 19 or the remote commander 29, executes various processing such as the album title input mode, album title display mode, album erasure mode, album movement mode, album AMS mode or the album repeat mode.

The album title input mode is such a mode established on pushing an edit button as an album button is pushed. In this album title input mode, the title of the album being played can be input. The "album title" is selected from the edit menu and the leading and last music airs are selected by range designation to input the album title.

Figure 8:
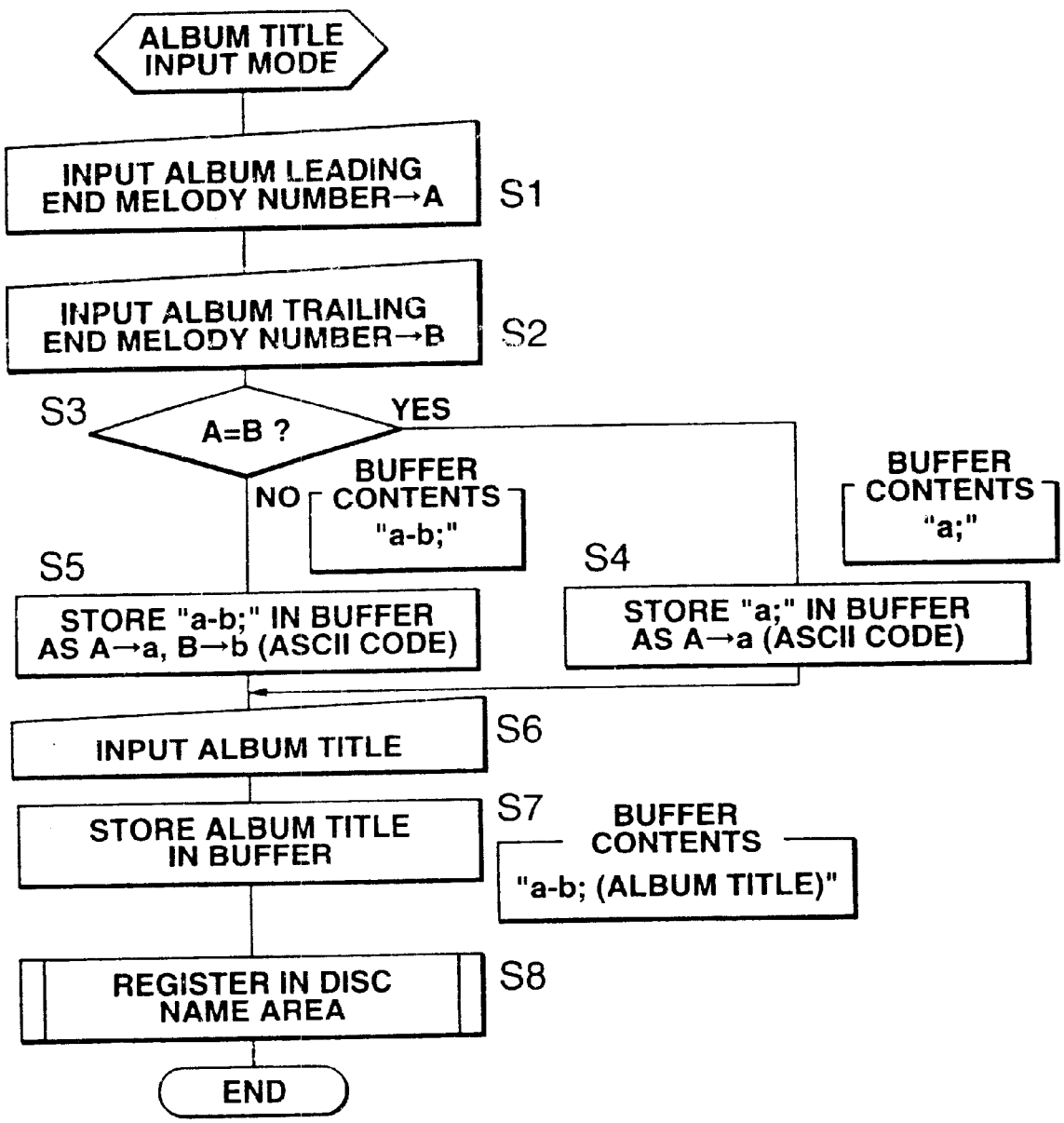
FIG. 8 is a flowchart showing the processing sequence in the album title input mode in the MD recorder.

The album title inputting mode is carried out in accordance with a sequence shown in the flowchart of FIG. 8.

For facilitating the processing and the description, it is assumed that a musical air in an album is designated by specifying the number of the music air by a special code "-".

It is noted that the music air designation by a special code "," is performed by processing similar to that for the special code "-" and can be coped with by changing the condition for decision. For further simplifying the explanation, it is also assumed that plural albums are not registered in an overlapping fashion on one track.

In the album title inputting mode, the inputting of the leading music air number is accepted and captured into a register (step S1) and subsequently the inputting of the last music air number is accepted and captured into a register (step S2).

It is then checked whether or not A=B, that is whether or not the leading music air number of the album is the same as the last music air number (step S3). If the result of decision at this step S3 is YES, that is if the leading music air number of the album is the same as the last music air number, the leading music air number of the album is rendered into an ASCII code and "a;" is stored in the buffer (step S4). If the result of decision at step S3 is NO, that is if the leading music air number of the album differs from the last music air number, the leading music air number of the album A is rendered into an ASCII code a, while the last leading music air number of the album A is rendered into an ASCII code b, and "a–b" is stored in the buffer (step S5).

The inputting of the album title then is accepted (step S6) and the input album title is stored in the buffer (step S7).

The contents thus stored in the buffer [a or a–b; (album title)] is registered in the disc name area (step S8) to finish the album title inputting mode.

Figure 9:
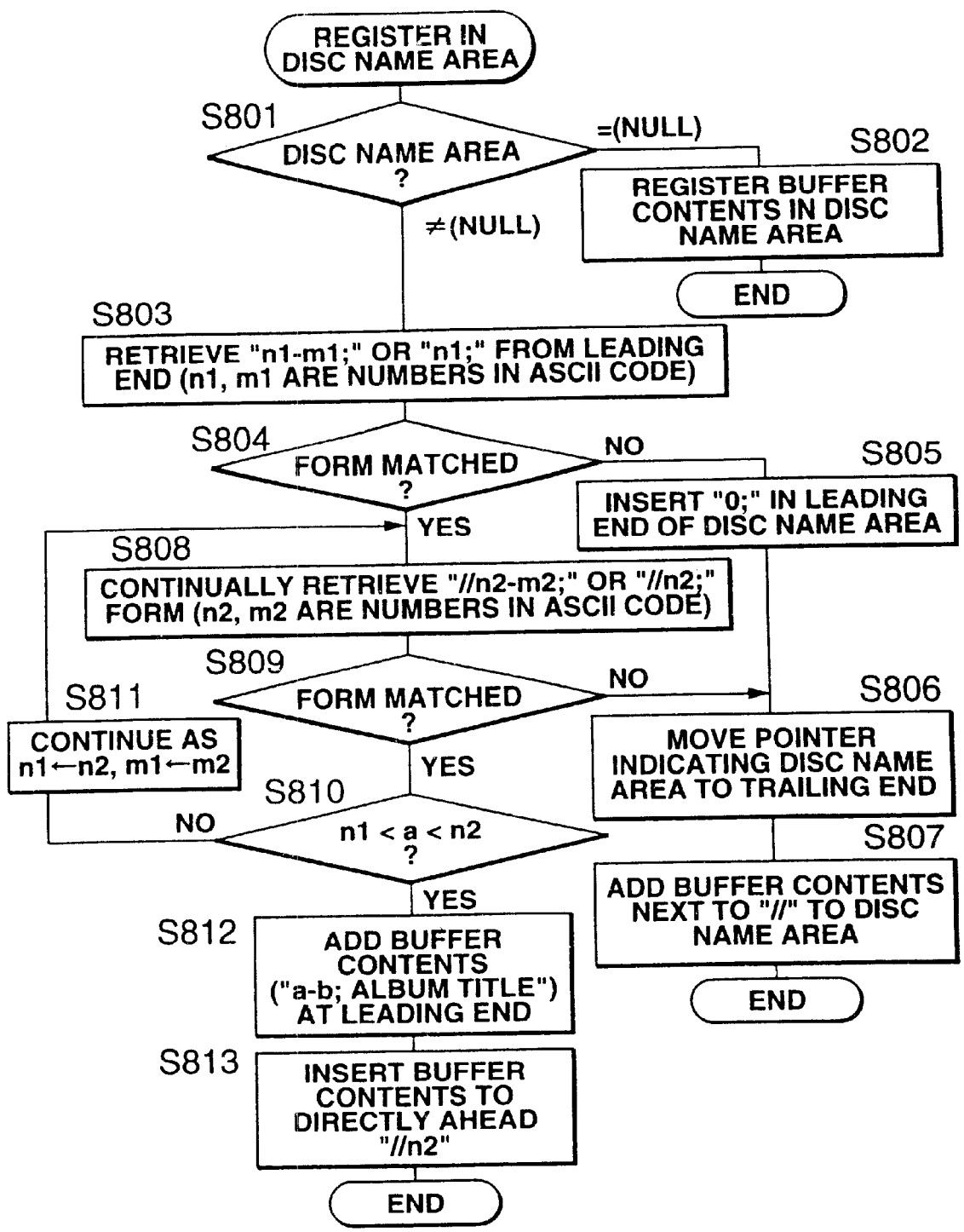
FIG. 9 is a flowchart showing the processing for registration in a disc name area in the album title input mode.

The processing of registration of the buffer contents in the disc name area at step S8 is performed in accordance with, for example, the sequence shown in the flowchart of FIG. 9.

That is, in the processing for registration in the disc name area, it is first verified whether or not the disc name area is null (step S801). The disc name area being null indicates that the disc name is null, that is blank. If the result of decision at step S801 indicates null, that is if the disc name area is null, the contents of the buffer [a or a–b; (album title)] is registered in the disc name area (step S802) to finish the registration processing in the disc name area. Thus, if the album title "8–10; GA" is input in the disc name area=null, the contents shown in FIG. 10 are registered in the disc name area.

If the result of decision at step S801 is_null, that is if the disc name area is not null, the form of "n1-m1;" or "n1;" is retrieved from the leading end (step S803) to check whether or not the form is coincident (step S804), where n1 and m1 are numerical figures in the ASCII code.

Figures 11A, 11B:
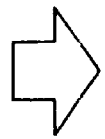
FIG. 11 is a schematic view showing another typical example of registration contents of a disc name area in case the registration processing in the disc name area in case of performing registration processing in the disc name area.

If the result of decision at step S804 is NO, that is if the form is not coincident, "0;" is inserted at the leading end of the disc name area (step S805). The pointer indicating the inside of the disc name area is moved to the trailing end (step S806). Next to the "//", the buffer contents [a or a–b; (album title)] is added to the disc name area (step S807) to finish the registration processing in the disc name area. By so doing, if there is the disc name "MiniDisc//" from the outset, as shown for example in FIG. 11A, an album name "1–7; SONY" is added, "0; MiniDisc//1–7; SONY" is registered in the disc name area, as shown in FIG. 11B.

On the other hand, if the result of decision at step S804 is YES, that is if the form coincides, the form of "n2-m2" or "n2;" is retrieved in succession (step S808) to check whether or not the form coincides (step S809). It is noted that n1 and m1 are numerical figures in the ASCII code.

If the result of decision at step S809 is NO, that is if the form fails to coincide, the program moves to step S806 to move the pointer indicating the inside of the disc name area to the trailing end to add the buffer contents next to "//" in the disc name area (step S807) to finish the registration processing in the disc name area. If the result of decision at step S809 is YES that is if the form coincides, it is checked whether or not the numerical figure a in the ASCII code indicating the musical air number in the album A is larger than n1 and smaller than n2 (step S810).

If the result of decision at step S810 is NO, that is if the numerical figure is not intermediate between n1 and n2, n2 and m2 are set to n1 and m1, respectively (step S811). The processing then reverts to step S808 to repeat the processing of steps S808 to S811. If the result of check at step S810 is YES, that is if the above numerical figure a is intermediate between n1 and n2, "//" is added to the leading end of the buffer contents [a or a–b; (album title)] (step S812).

Figures 12, 13:
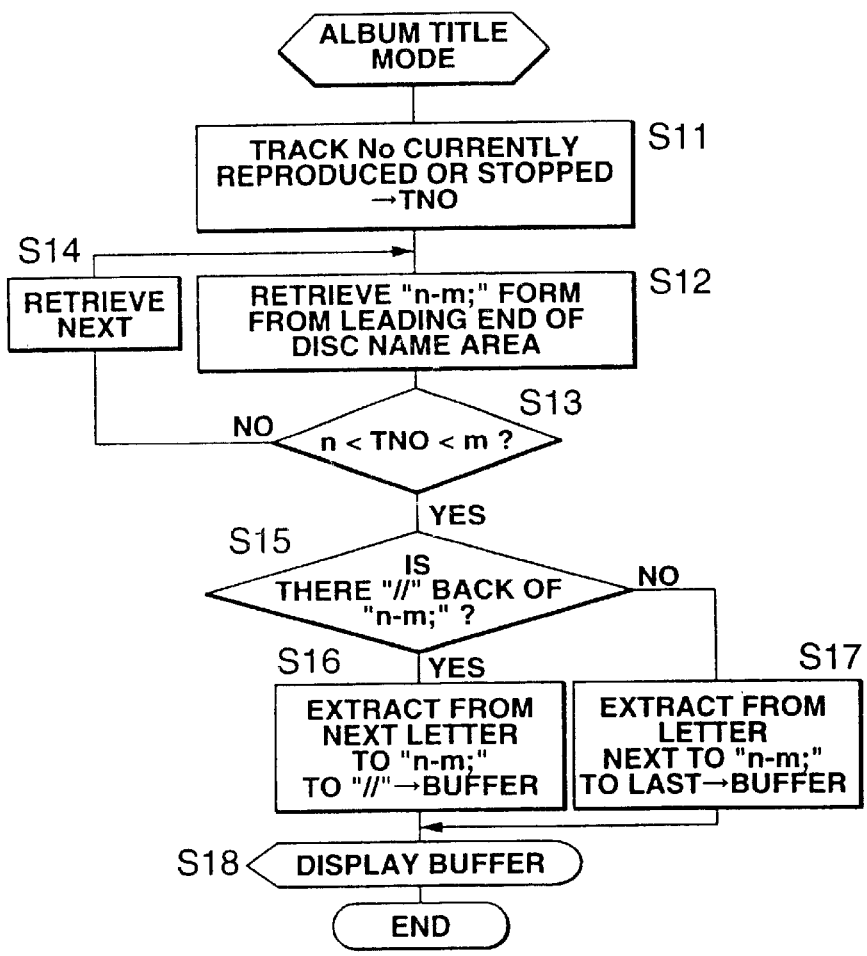
FIG. 12 is a schematic view showing still another typical example of registration contents of a disc name area in case the registration processing in the disc name area in case of performing registration processing in the disc name area.
FIG. 13 is a flowchart showing the processing sequence of the album title display mode in the MD recorder.

The buffer contents [//a or a–b; (album title)] is inserted directly before "//n2" (step S813) to finish the registration processing in the disc name area. In this case, if the album title "8–10; GA" shown in FIG. 10 is registered from the outset and an album title "1–7; SONY" is added, the contents shown in FIG. 12 are registered in the disc name area.

The album title display mode is set on pushing e.g., a display mode button or on selection of an album title from the display menu title. The processing of this album title display mode is carried out in accordance with the procedure shown for example in FIG. 13.

In this album title display mode, the track number currently being displayed or at a standstill is captured into the register TNO (step S11).

Then, from the leading end of the disc name area, the form "n–m;" is retrieved (step S12) to check whether or not the value of the register TNO is larger than n and smaller than m as retrieved (step S13).

If the result of decision at step S13 is NO, that is if the value of the register TNO is not intermediate between n and m as retrieved, setting is made for the next retrieving (step S14) to revert to step S12 to repeat the processing of from step S12 to step S14. If the result of decision at step S13 is YES, that is if the value of the register TNO is intermediate between n and m as retrieved, it is checked whether or not there is "//" back of "n–m;" (step S15).

If the result of decision at this step S15 is YES, that is if there is "//" back of "n–m;", the letters from the letter next following "n–m;" up to "//" are extracted and stored in the buffer (step S16). If the result of decision at this step S15 is NO, that is if there is no "//" in back of "n–m;", the letters up to the last one of "n–m;" is extracted and stored in the buffer (step S17).

The buffer contents are displayed (step S18) to finish the present album title display mode.

The album erasure mode is set by pushing an album button and simultaneously pushing an erasure button. In this mode, the album being played can be erased in its entirety. This album erasure mode is executed by selecting an album erasure from the edit menu and selecting the group desired to be erased from the album name.

Figure 14:
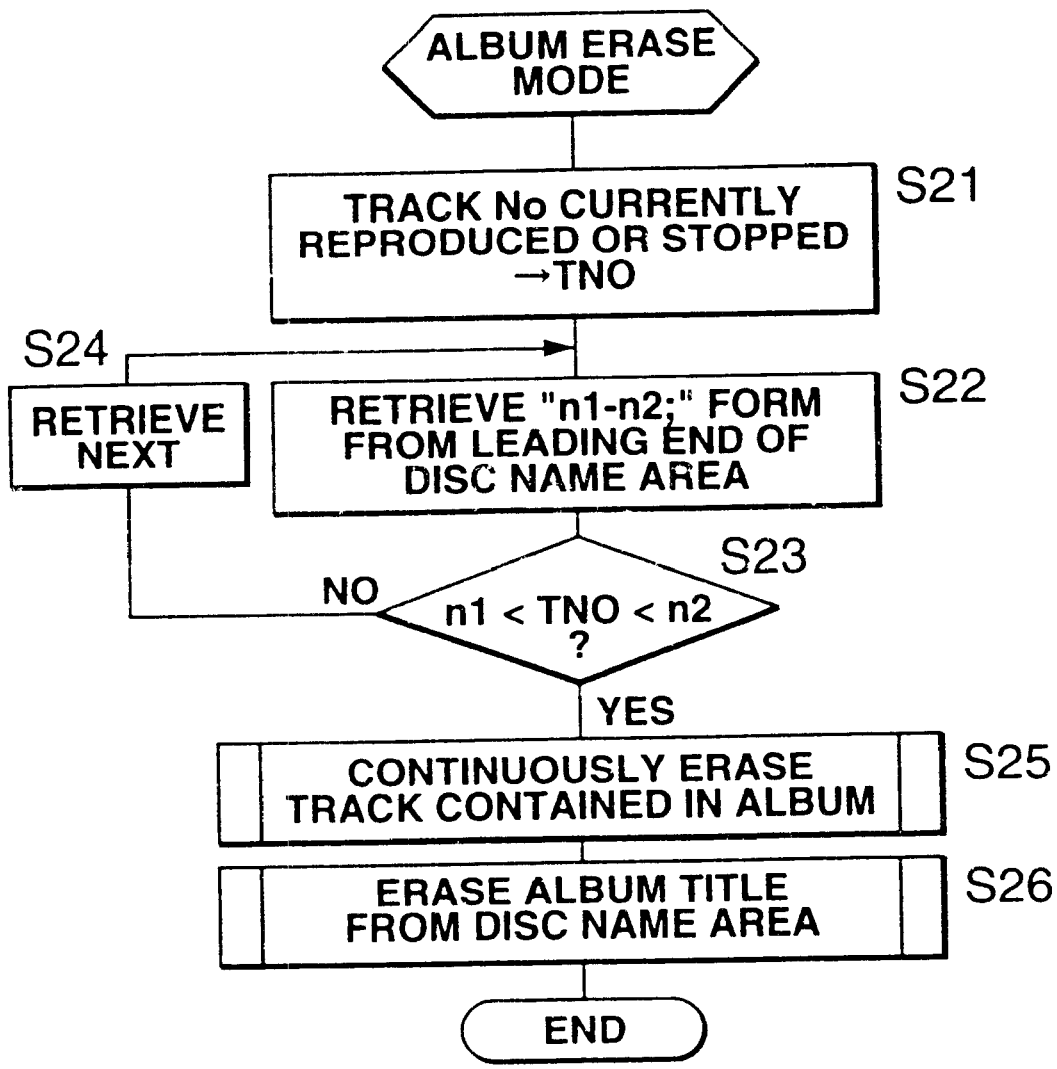
FIG. 14 is a flowchart showing the processing sequence of the album erasure mode in the MD recorder.

The processing of this album erasure mode is carried out in accordance with e.g., the procedure shown in the flow-chart of FIG. 14.

In the processing of this album erasure mode, the track number currently being reproduced or at a standstill is captured into the register TNO (step S21).

Then, from the leading end of the disc name area, the form "n1–n2" is retrieved (step S22) to check whether or not the value of the register TNO is larger than n1 and smaller than n2 as retrieved (step S23).

If the result of decision at step S23 is NO, that is if the value of the register TNO is not intermediate between n1 and n2 as retrieved, the next retrieval is set (step S24). Then, processing reverts to step S22 to repeat the processing of steps S22 to S24. If the result of decision at step S23 is YES, that is if the value of the register TNO is intermediate between n1 and n2 as retrieved, the tracks contained in the album are continuously erased (step S25) and the album title is erased from the disc name area (step S26) to complete the processing of the album erasure mode.

Figures 15A, 15B:
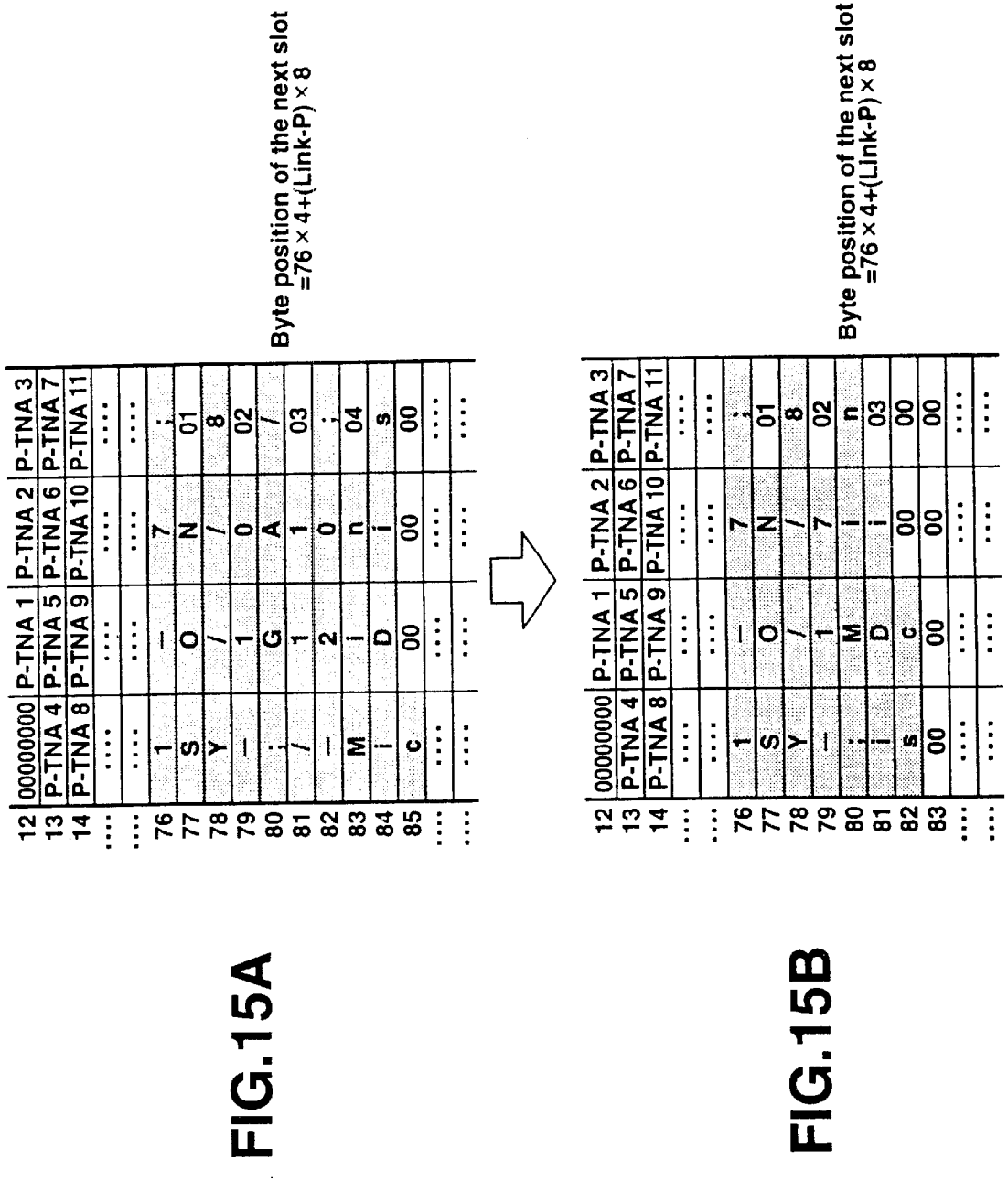
FIG. 15 schematically shows a typical example of registration contents of the disc name area in case of performing the processing of album erasure mode.

If, from the disc name area in which "1–7; SONY//8–10;GA//11–20; MiniDisc" has been registered, the album "8–10; GA" has been erased by this album erasure mode processing, as shown in FIG. 15A, the registered contents of the disc name area are "1–7; SONY//8–17; MiniDisc", as shown in FIG. 15B.

Figure 16:
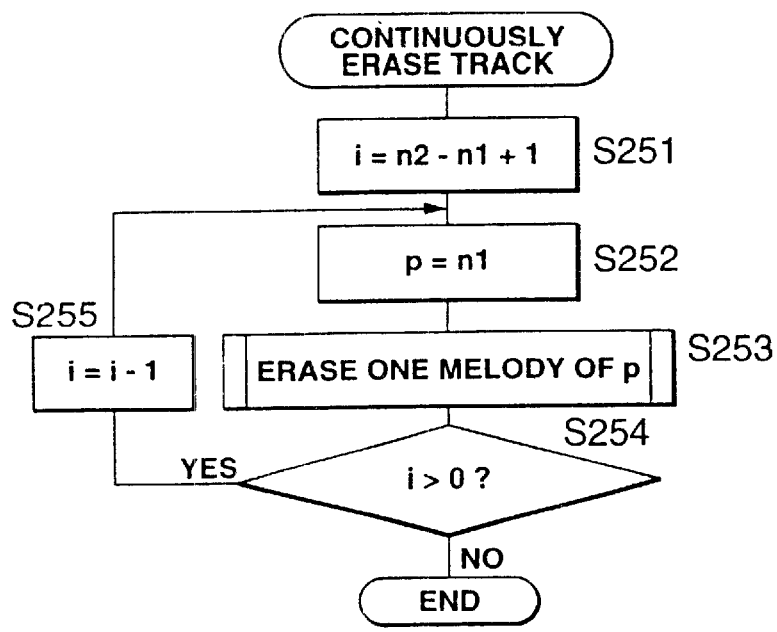
FIG. 16 is a flowchart showing the continuous track erasure processing in the album erasure mode.

The continuous track erasure at step S25 is carried out in accordance with the sequence shown e.g., in the flowchart of FIG. 16.

That is, in the continuous track erasure, the number of albums recorded is calculated by the operation of i=n2−n1+1 (step S251).

Then, p=n1 is set to set a pointer p of the music air to be erased (step S252).

Then, one air erasure processing for erasing one music air for which the pointer p has been set (step S253).

For verifying whether or not the music airs recorded in the album have been processed repeatedly, it is checked whether or not the number of recorded music airs in the album is larger than 0 (step S254). If the result of decision is YES, that is if the number of recorded music airs in the album is larger than 0, the number of recorded music airs is decremented by 1 (step S255) to revert to step S252. The processing of steps S252 to 255 is repeated until the number of recorded airs is 0 to finish the continuous track erasure processing.

Figure 17:
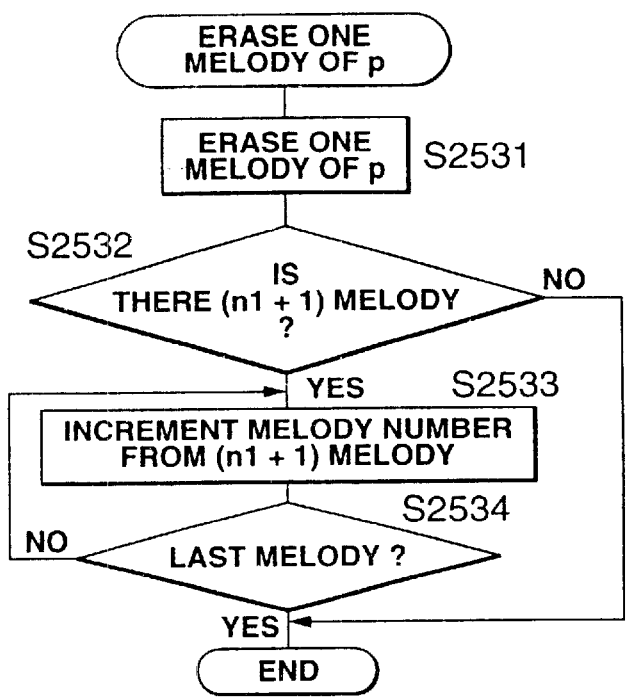
FIG. 17 is a flowchart showing the single music air erasure processing in the album erasure mode.

It is noted that the music air erasure processing at step S253 is carried out in accordance with the procedure shown in the flowchart of FIG. 17.

That is, in the one-air erasure processing, the music air, for which the pointer p has been set, is erased (step S2531).

It is then verified whether or not there is the music air number (n1+1) (step S2532). If the result of decision is NO, that is if there is no music air number (n1+1), the continuous track erasure processing is terminated.

If the result of decision at step S2532 is YES, that is if there is the music air number (n1+1), the music air number as from (n1+1) is incremented by one (step S2533).

Next, it is checked whether or not the music air number is the last number (step S2534). If the result of check is NO, that if the music air number is not the last one, processing reverts to step S252 to repeat the processing from steps S2533 and S2534 until the result of decision at step S256 is YES to complete the one-air erasure processing.

Figure 18:
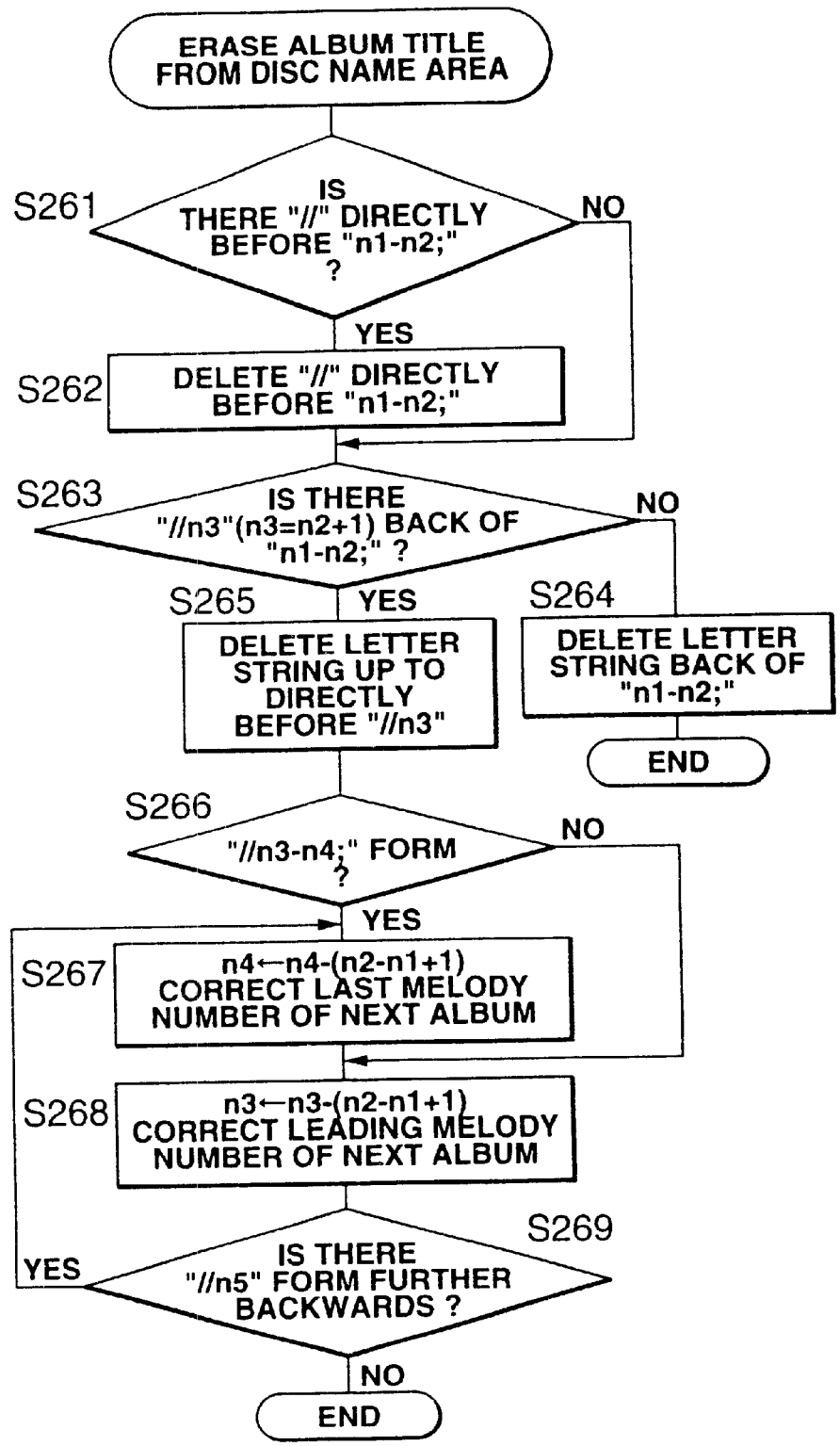
FIG. 18 is a flowchart showing the album title erasure processing in the album erasure mode.

The album title erasure processing at the above step S26 is carried out in accordance with e.g., the procedure shown in the flowchart of FIG. 18.

In this album title erasure processing, it is first checked whether or not there is "//" directly ahead of "n1–n2" (step S261).

If the result of decision at this step S261 is YES, that is if there is "//" directly ahead of "n1–n2", "//" directly ahead of "n1–n2" is deleted at step S262 to then transfer to step S263. If the result of decision at this step S261 is NO, that is if there is no "//" directly ahead of "n1–n2", processing directly transfers to step S263.

At step S263, it is checked whether or not there is "//n3" (n3=n2+1) at back of "n1–n2". If the result of decision at this step S263 is NO, that is if there is no "//n3" at back of "n1–n2", the letter string downstream of "n1–n2" is deleted (step S264) to terminate the album title erasure processing. If the result of decision at this step S263 is YES, that is if there is "//n3" at back of "n1–n2", the letter string up to the letter directly ahead of "//n3" is erased (step S265). Then, processing transfers to step S266.

At step S266, it is verified whether or not the form is "//n3–n4". If the result of check at this step S266 is NO, that is if the form is not "//n3–n4", processing transfers to step S268. If the result of check at this step S266 is YES, that is if the form is "//n3–n4", n4−(n2−n1+1) is set to new n4 to correct the last music air number of the next album (step S267). The processing then transfers to step S268.

At step S268, n3−(n2−n1+1) is set to new n3 to correct the leading music air number of the next album.

It is then checked whether or not there is the form of "//n5" further backwards (step S269). If the result of check is YES, that is if there is the form "//n5" backwards, processing reverts to step S267 to repeat the processing of from step S267 to step S269 until the result of decision at this step S256 is NO, that is if the form "//nx" ceases to exit backwards (step S267 to step S269) to correct the music air number in succession to terminate the album title erasure processing operation.

Thus, in this MD recorder 1, if a predetermined group or a predetermined album in the plural groups or albums are commanded to be erased in a block, the correlation among the range information of the program numbers forming the group(s) or album(s) in the second management data is edited to manage the program(s) recorded in the music air 90 as plural groups or albums to perform editing by group- or album-based block erasure.

Figure 19:
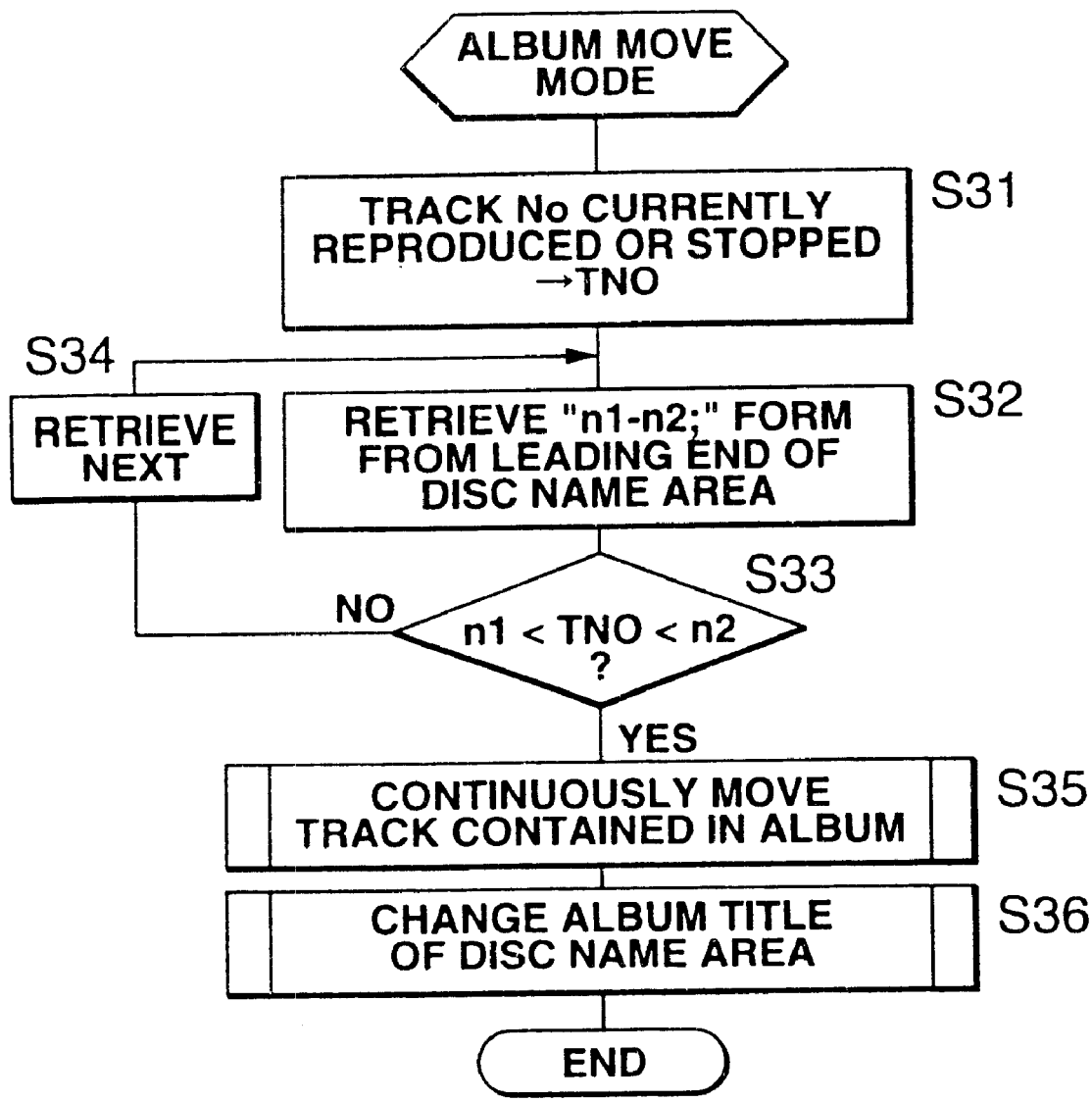
FIG. 19 is a flowchart showing the album movement mode in the MD recorder.

The processing of the album movement mode is carried out in accordance with the processing shown in the flowchart of FIG. 19.

In this album movement mode, the track number, the track number currently being reproduced or at a standstill is captured into the register TNO (step S31).

Then, from the leading end of the disc name area, the form "n1–n2"is retrieved (step S32) to check whether or not the value of the register TNO is larger than n1 and smaller than n2 (step S33).

If the result of decision at step S33 is NO, that is if the value of the register TNO is not intermediate between n1 and n2 as retrieved, the next retrieval is set (step S34). Then, processing reverts to step S32 to repeat the processing of steps S32 to S34. If the result of decision at step S33 is YES, that is if the value of the register TNO is intermediate between n1 and n2 as retrieved, the tracks contained in the album are continuously moved (step S35) and the album title is changed from the disc name area (step S36) to complete the processing of the album movement mode.

Figures 20A, 20B:
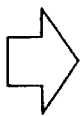
FIG. 20 schematically shows a typical example of registration contents of the disc name area in case of performing the processing of album movement mode.

If, from the disc name area in which "1–7; SONY//8–10;GA//11–20; MiniDisc" have been registered, the album "8–10; GA" has been moved to backwardly of the album "11–20; MiniDisc", as shown in FIG. 20, the registered contents of the disc name area are "1–7; SONY//8–17; MiniDisc//18–20; GA", as shown in FIG. 20.

In this MD recorder 1, if the sequence change is commanded on a predetermined group in the plural groups or predetermined group in the album, the correlation between the range information of the program numbers making up the groups or albums in the second management data and the group or album names is edited and the predetermined groups or albums are moved in a block, whereby the programs recorded in the magneto-optical disc can be supervised as plural groups or albums to cause movement on the group or album basis.

Figure 21:
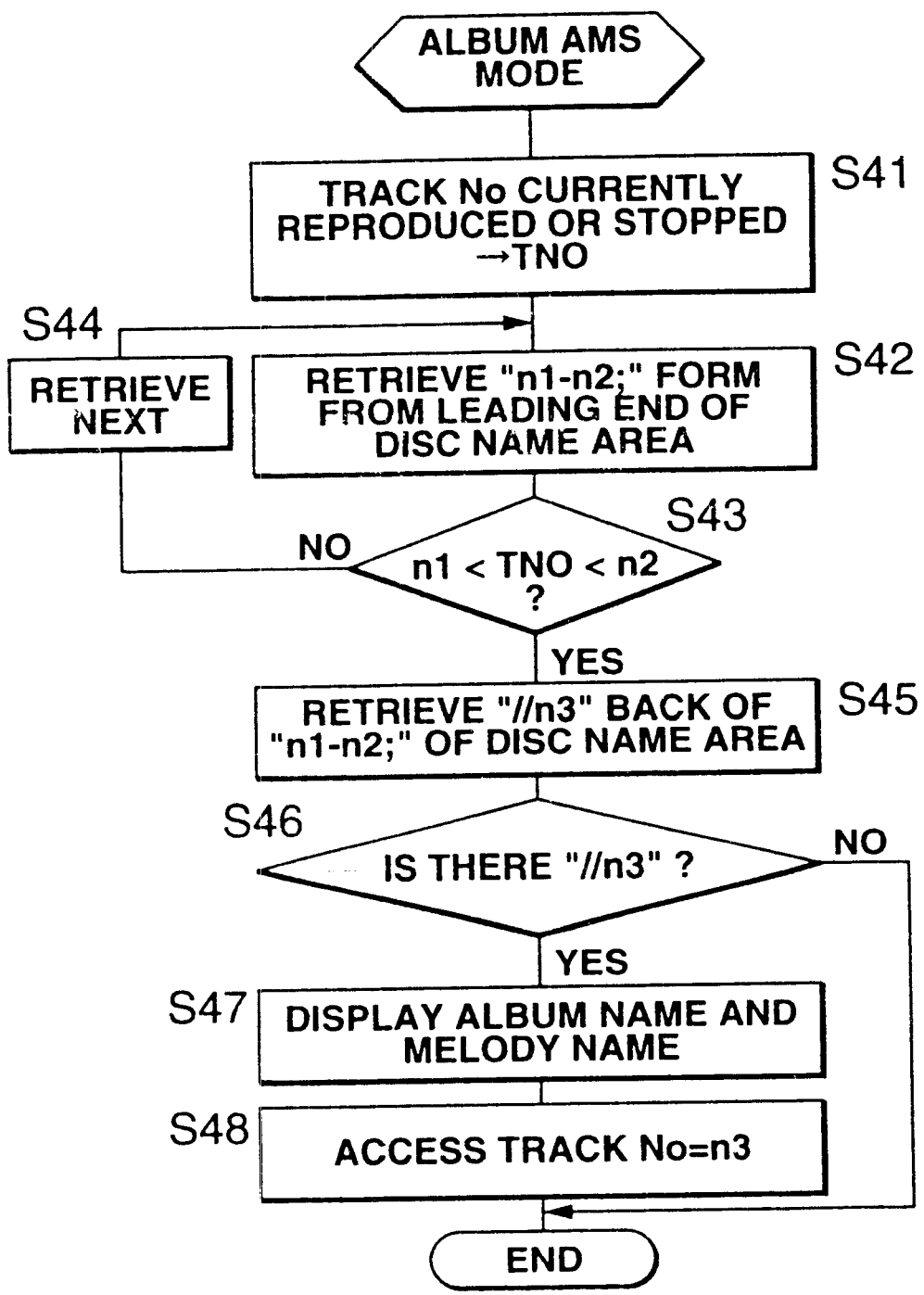
FIG. 21 is a flowchart showing the processing sequence of the album AMS mode in the MD recorder.

The album AMS mode is set by pushing an album button and simultaneously pushing an FF/FR button. In this mode, the album next to the album containing the musical air being played can be accessed. The processing in this album AMS mode is carried out by a procedure shown for example in the flowchart of FIG. 21.

In this album AMS mode, the track number, the track number currently being reproduced or the track number at a standstill is captured into the register TNO (step S41).

Then, from the leading end of the disc name area, the form "n1–n2" is retrieved (step S42) to check whether or not the value of the register TNO is larger than n1 and smaller than n2 (step S43).

If the result of decision at step S43 is NO, that is if the value of the register TNO is not intermediate between n1 and n2 as retrieved, the next retrieval is set (step S44). Then, processing reverts to step S42 to repeat the processing of steps S42 to S44. If the result of decision at step S43 is YES, that is if the value of the register TNO is intermediate between n1 and n2 as retrieved, "//n3" at back of "n1–n2" is retrieved (step S45).

At the next step S46, it is checked whether or not "//n3" is present backwardly of "n1–n2". If the result of check at this step is NO, that is if there is no "//n3" backwardly of "n1–n2", the processing of the album AMS mode is terminated. If the result of check at this step is YES, that is if there is "//n3" backwardly of "n1–n2", the corresponding album name and the music air name are demonstrated in the track number n3 (step S47) to access the track number n3 (step S48) to terminate the processing of the album AMS mode.

Figure 22:
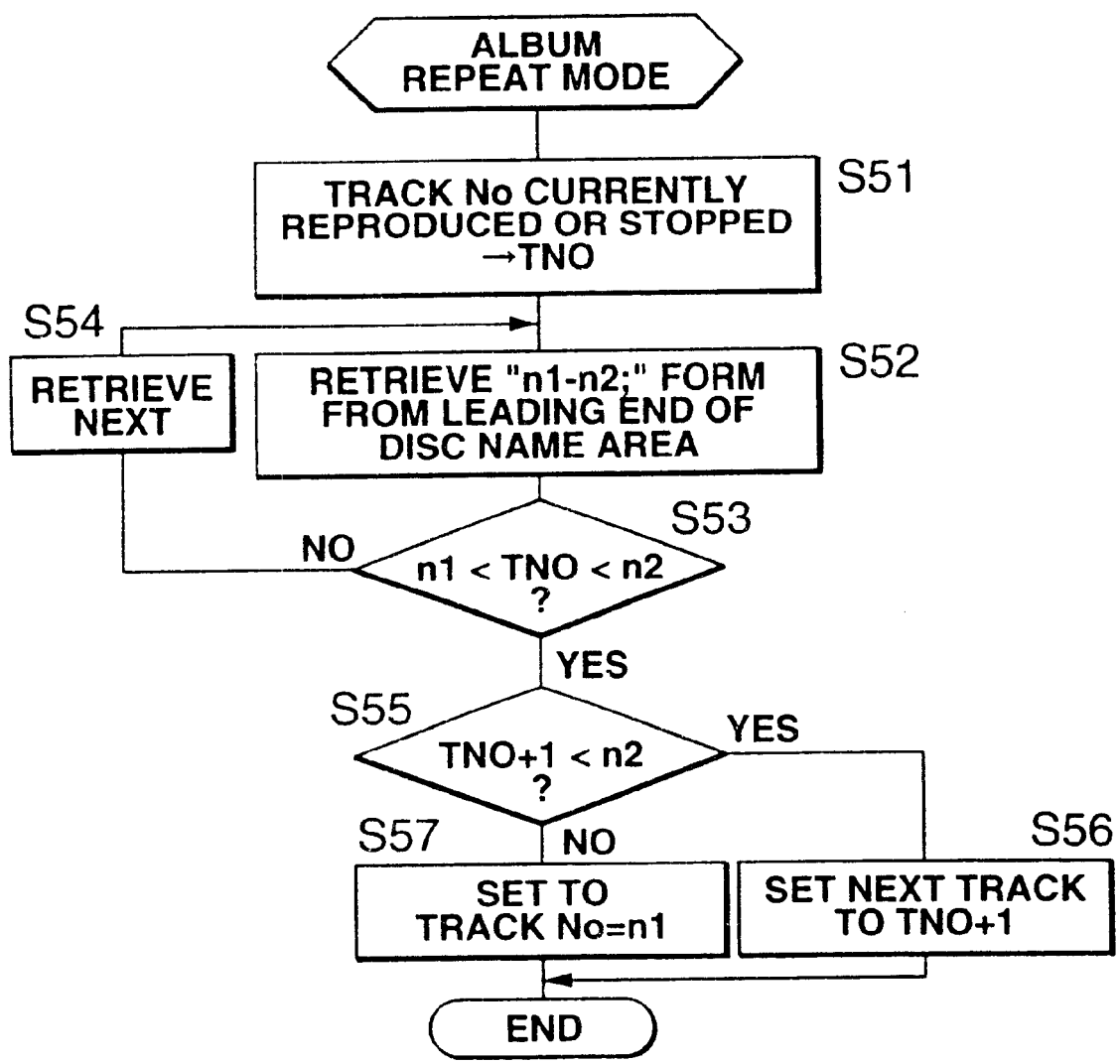
FIG. 22 is a flowchart showing the processing sequence of the album repeat mode in the MD recorder.

The album repeat mode processing is performed in accordance with the processing shown in the flowchart of FIG. 22.

In this album repeat mode, the track number, the track number currently being reproduced or the track number at a standstill is captured into the register TNO (step S51).

Then, from the leading end of the disc name area, the form "n1–n2" is retrieved (step S52) to check whether or not the value of the register TNO is larger than n1 and smaller than n2 (step S53).

If the result of decision at step S53 is NO, that is if the value of the register TNO is not intermediate between n1 and n2 as retrieved, the next retrieval is set (step S54). Then, processing reverts to step S52 to repeat the processing of steps S52 to S54. If the result of decision at step S53 is YES, that if the value of the register TNO is intermediate between n1 and n2 as retrieved, it is checked whether or not the value of TNO+1 is smaller than n2 (step S55).

If the result of decision at this step S55 is YES, that is if the value of TNO+1 is smaller than n2, the next track is set to TNO+1 (step S56). If the result of decision at this step S55 is NO, that is if the value of TNO+1 is smaller than n2, n1 is set a the track number (step S57) to terminate the processing at this album repeat mode.

The system controller 11 in this MD recorder 1 has a variety of processing functions, such as linking or splitting of albums or erasure, linking and splitting of tracks in an-album.

Figures 23A, 23B:
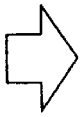
FIG. 23 schematically shows a typical example of the registration contents of the disc name area in case of performing editing processing by album linking.

That is, in this MD recorder 1, if it is commanded to link the predetermined groups or albums, the correlation between the range information of the program numbers forming the above groups or albums in the second management data and the group or album names is edited to supervise the programs recorded in the magneto-optical disc 90 as plural groups or albums to perform the editing of linking the groups or albums. In the editing processing by album linking, as shown in FIG. 23A, if, in a disc in the disc name area of which "1–7; SONY//8–10;GA//11–20; MiniDisc" is registered, the album "1–7; SONY" is linked to the album "8–10;GA", the album "GA" vanishes, with the registered contents in the disc name area being "1–10; SONY//11–20; MiniDisc", as shown in FIG. 23B.

Figures 24A, 24B:
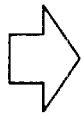
FIG. 24 schematically shows a typical example of the registration contents of the disc name area in case of performing editing processing by album splitting.

Moreover, if, in this MD recorder 1, the predetermined group or album name is commanded to be divided in two portions, the correlation between the range information of the program numbers making up the predetermined group or album name in the second management data and the group or album name can be edited to supervise the programs recorded on the magneto-optical disc 90 as plural groups or album names to divide the group or the album name in two. In this editing processing by album division, as shown in FIG. 24A, if, in a disc in a disc name area of which has been recorded "1–10; SONY//11–20; MiniDisc", an album has been divided between the fifth and the sixth music airs, the registration contents of the disc name area is "1–5; SONY// 6–10; 11–20; MiniDisc", as shown in FIG. 24B. At a time point this processing is finished, the album name for 6–10 is not afforded so that the album name is blank, or null. Meanwhile, the album name, which is blank, may be assigned by another processing not shown in the present invention.

Figures 25A, 25B:
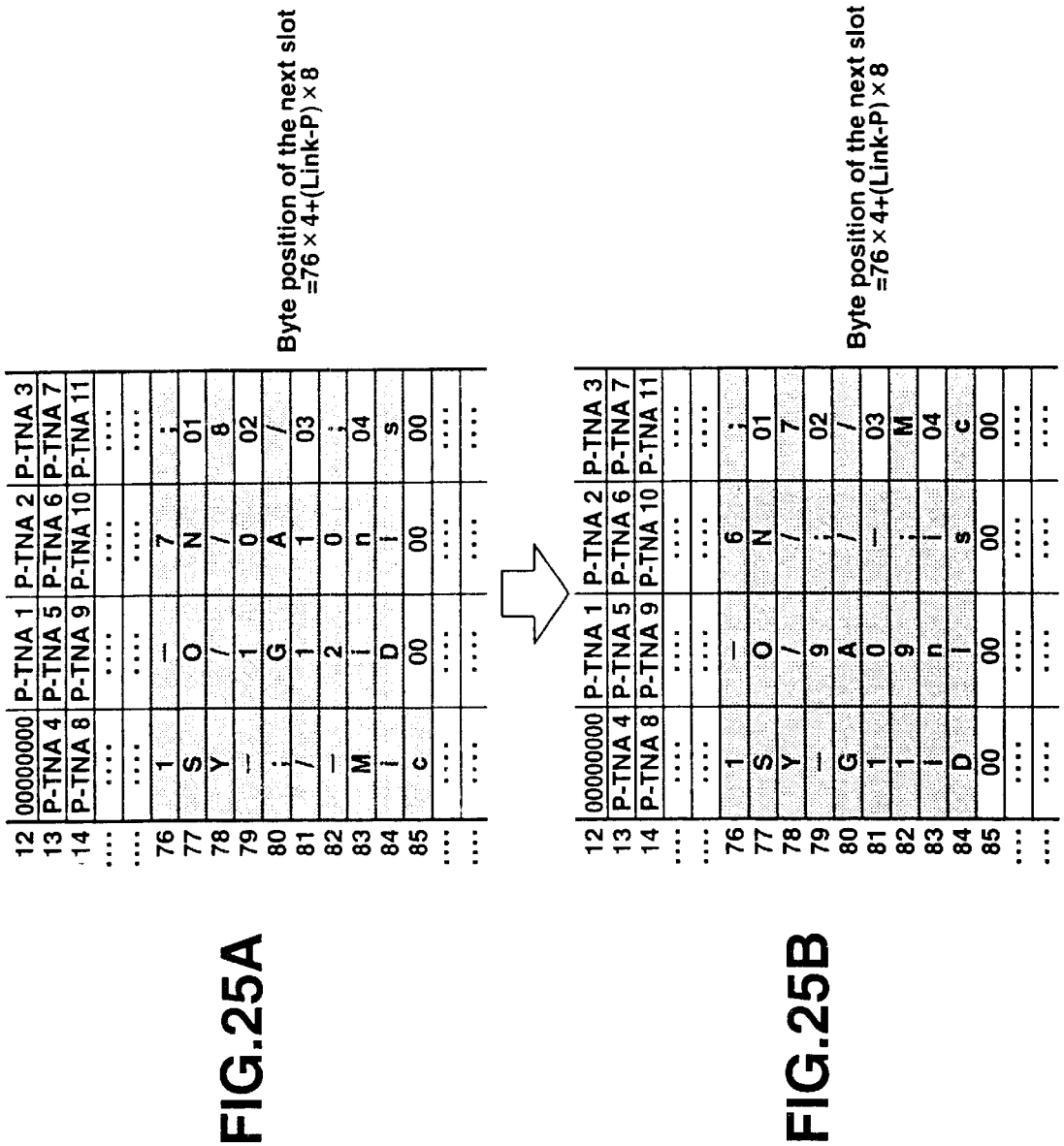
FIG. 25 schematically shows a typical example of the registration contents of the disc name area in case of performing editing processing by erasing tracks in an album.

Moreover, if, in this MD recorder 1, the programs making up the predetermined group or album in the plural groups or albums are erased, the correlation between the range information of the program numbers making up the group or the album in the second management data and the group name or album can be edited to supervise the programs recorded on the magneto-optical disc 90 as plural groups to erase the programs in the group or album by way of editing. In the editing processing by erasure of the tracks in an album, if, in a disc in the disc name area of which "1–7; SONY//8–10; GA//11–20; MiniDisc" has been registered, as shown for example in FIG. 25A, the third music air is erased, the former fourth air is re-defined to be the new third air, with the original fifth air being re-defined to be the new fourth air, whereby the registration contents in the disc name area is "1–6; SONY//7–9; GA//10–19; MiniDisc", as shown in FIG. 25B.

Figures 26A, 26B:
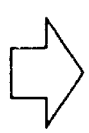
FIG. 26 schematically shows a typical example of the registration contents of the disc name area in case of performing editing processing by linking tracks in an album.

Moreover, if, in this MD recorder 1, two programs making up a predetermined group or album of the plural groups or albums are linked together, the correlation between the range information of the program numbers making up the group or the album in the second management data and the group name or album can be edited to supervise the programs recorded on the magneto-optical disc 90 as plural groups to link two programs recorded in the group or album. In the editing processing by track linking in an album, if, in a disc in the disc name area of which "1–7; SONY//8–10; GA//11–20; MiniDisc" has been registered, as shown for example in FIG. 26A, the first and second music airs are linked, the former first and second music airs are shifted to be the new first air, with the original third air being shifted to be the new second air, whereby the registration contents in the disc name area is "1–6; SONY//7–9; GA//10–19; MiniDisc", as shown in FIG. 26B.

Figures 27A, 27B:
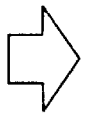
FIG. 27 schematically shows a typical example of the registration contents of the disc name area in case of performing editing processing by splitting tracks in an album.

Moreover, if, in this MD recorder 1, predetermined programs making up a predetermined group or album of the plural groups or albums are linked together, the correlation between the range information of the program numbers making up the group or the album in the second management data and the group name or album can be edited to supervise the programs recorded on the magneto-optical disc 90 as plural groups to split the program recorded in the group or album. In the editing processing by track splitting in an album, if, in a disc in the disc name area of which "1–7; SONY//8–10; GA//11–20; MiniDisc" has been registered, as shown for example in FIG. 27A, the fifth music air is split, the former fifth music air is rearwardly shifted to be the new fifth and sixth music airs, with the original sixth air being rearwardly shifted to be the new seventh air, whereby the registration contents in the disc name area is "1–8; SONY//9–11; GA//12–21; MiniDisc", as shown in FIG. 27B.

Moreover, this system controller 11 in the MD recorder 1 performs the processing of reflecting a series of recordings as being the recordings by an album by pushing an album button and simultaneously scanning a recording button.

Figures 28A, 28B:
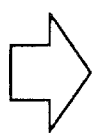
FIG. 28 schematically shows registration contents in case of write-once recording plural music airs.

For example, if, ten airs are newly recorded on a disc, in the disc name area of which "1–7; SONY//8–10; GA" has been registered, as shown in FIG. 28A, the registration contents in the disc name area are "1–7; SONY//8–10; GA//11–20", as shown in FIG. 28B. That is, "//11–20" has been newly recorded next to the disc name area in which has been recorded "1–7; SONY//8–10; GA".

Figure 29A:
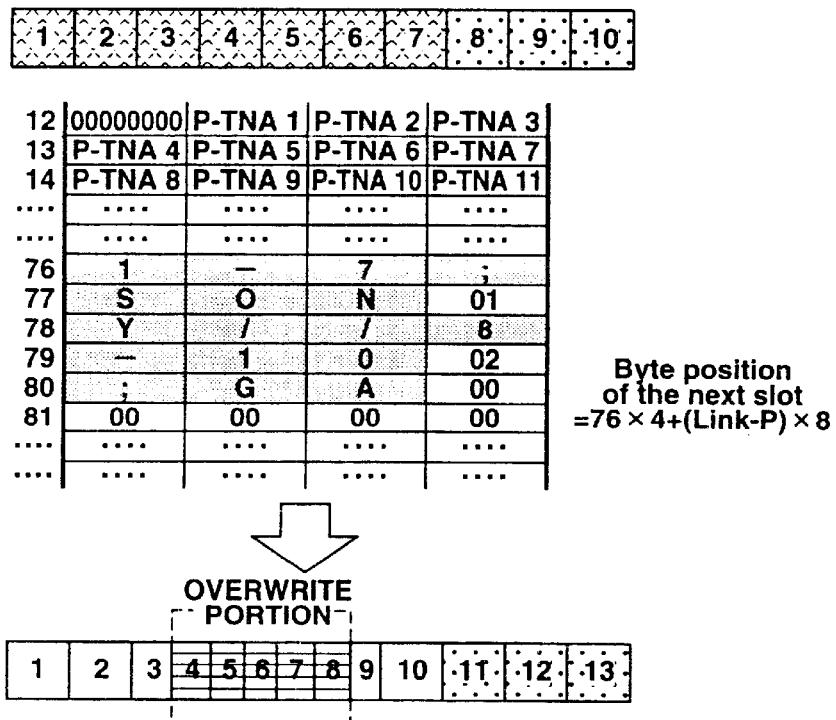
FIG. 29 schematically shows registration contents in case of overwrite recording plural music airs.
Figure 29B:
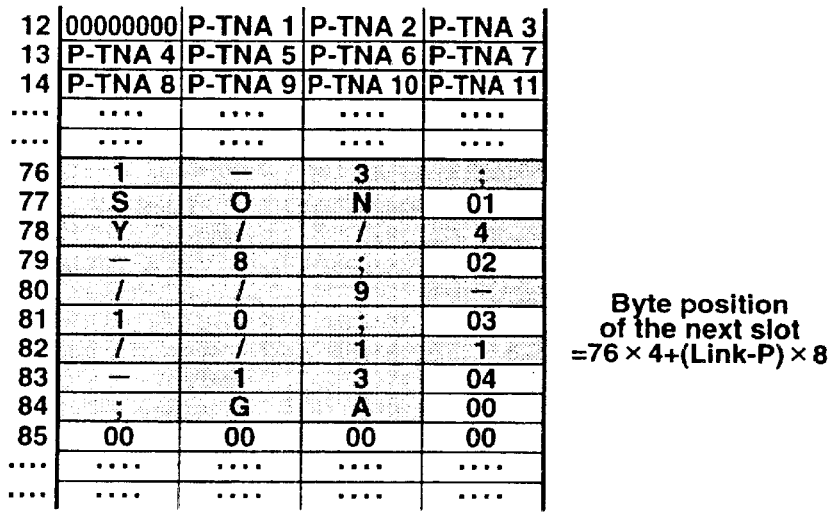

For example, if five airs are overwrite-recorded as an album in a mid portion of the third air of the disc in the disc name area of which has been recorded "1–7; SONY//8–10; GA", as shown in FIG. 29A, the unity as an album of "1–7; SONY" is fractionated into "1–3; SONY" and into "9–10", and an album "4–8" is overwritten in the former half from the latter half of the third air to a mid portion of the sixth air, so that the registration contents of the disc name area are "1–3; SONY//4–8; //9–10;//11–13; GA", as shown in FIG. 29B. Since the air comes to a close before the tenth air prior to the tenth air before overwrite-recording of the recorded portion as shown in FIG. 29B on the disc recorded as in FIG. 29A, there is produced no change in the total recording capacity.

What is claimed is:

1. An editing apparatus for editing a program recorded on a recording medium that includes a program area for recording a plurality of programs and a management area within which is recorded first management data for managing program names for the plurality of recorded programs and second management data including range information of program numbers making up each of a plurality of groups into which the plurality of recorded programs are collected, special codes partitioning the groups and group names, comprising:

operating means for commanding a division of a predetermined program of the plurality of programs and predetermined groups of the plurality of groups; and editing means for editing a correlation of the range information and the group names when the division is commanded by the operating means.

2. The editing apparatus according to claim 1, wherein the program names in the first management data are managed in association with the program numbers of each of the plurality of programs, and when the division is commanded by the operating means the correlation between the program numbers and the program names is concomitantly edited.

3. The editing apparatus according to claim 1, wherein the editing means further edits the range of the program numbers forming a group following the predetermined group containing the predetermined program commanded to be divided.

4. An editing apparatus for editing a program recorded on a recording medium that includes a program area for recording a plurality of programs and a management area within which is recorded first management data for managing program names for the plurality of programs and second management data including range information of program numbers making up each of a plurality of groups into which the plurality of recorded programs are collected, special codes partitioning the groups and group names, comprising:

operating means for commanding a division of a predetermined group of the plurality of groups into two groups; and editing means for editing a correlation of the range information and the group names when the division is commanded by the operating means.

5. The editing apparatus according to claim 4, wherein when the division is commanded by the operating means, a group name of the predetermined group is assigned to one of the two groups resulting from the division.

6. The editing apparatus according to claim 5, wherein when the division is commanded by the operating means, a group name of an other of the two groups resulting from the division is blank.

7. An editing method for editing a program recorded on a recording medium that includes a program area for recording a plurality of programs and a management area within which is recorded first management data for managing program names for the plurality of recorded programs and second management data including range information of program numbers making up each of a plurality of groups into which the plurality of recorded programs are collected, special codes partitioning the groups and group names, comprising the steps of:

commanding a division of a predetermined program of predetermined groups of the plurality of groups; and editing a correlation of the range information and the group names when the division is commanded.

8. The editing method according to claim 7, wherein the program names in the first management data are managed corresponding to the program numbers of the plurality of programs, and the correlation between the program numbers and the program names is concomitantly edited when the division is commanded.

9. An editing method for editing a program recorded on a recording medium that includes a program area for recording a plurality of programs and a management area within which is recorded first management data for managing program names for the plurality of recorded programs and second management data including range information of program numbers making up each of a plurality of groups into which the plurality of recorded programs are collected, special codes partitioning the groups and group names, comprising the steps of:

commanding division of a predetermined group of the plurality of groups into two groups; and editing a correlation of the range information and the group names when the division is commanded.

10. The editing method according to claim 9, wherein when the division is commanded, a group name of the predetermined group is assigned to one of the two groups resulting from the division.

11. The editing method according to claim 9, wherein when the division is commanded, a group name of an other of the two groups resulting from the division is blank.

* * * * *